United States Patent [19]

O'Brien et al.

[11] Patent Number: 4,972,368

[45] Date of Patent: Nov. 20, 1990

[54] INTELLIGENT SERIAL I/O SUBSYSTEM

[75] Inventors: Michael D. O'Brien, Brisbane, Australia; Antonio B. Merenda, Sunnyvale, Calif.; Kim H. Laurie, Herston; Robert B. Waldie, Pinjarra Hills, both of Australia

[73] Assignee: Stallion Technologies, Pty. Ltd., Brisbane, Australia

[21] Appl. No.: 164,370

[22] Filed: Mar. 4, 1988

[51] Int. Cl.$^5$ .............................................. G06F 13/12
[52] U.S. Cl. ................... 364/900; 364/931.4; 364/931.44; 364/942.4; 364/927.99; 364/964.31
[58] Field of Search ... 364/200 MS File, 900 MS File

[56]  References Cited

U.S. PATENT DOCUMENTS

| | | | |
|---|---|---|---|
| 3,534,338 | 10/1970 | Christensen et al. | 364/200 |
| 3,702,462 | 11/1972 | England | 364/200 |
| 4,100,601 | 7/1978 | Kaufman et al. | 364/200 |
| 4,636,947 | 1/1987 | Ward | 364/200 |

*Primary Examiner*—Thomas M. Heckler
*Attorney, Agent, or Firm*—The Dulin Law Firm

[57] ABSTRACT

An I/O subsystem is provided for a series of terminals that communicate via a system bus with a host PC, supporting a series of UNIX ® based PC application programs. The I/O subsystem includes a plurality of I/O subassemblies, each having a series of ports dedicated to the user terminals on a one-to-one basis. Each I/O subassembly includes a CPU including internal memory, a dual ported memory and serial I/O interfaces. Keystroke signals from a sending terminal are transmitted through the interface of the dedicated I/O subassembly to the memory of the subassembly for interpretation and then retransmitted to the sending terminal and/or host PC. Each I/O subassembly dual ported memory is programmed with a UNIX ® based I/O subsystem management method. Additional features of each I/O subassembly include flexible message handling, remote procedure calls and speedup of character input/output processing.

26 Claims, 15 Drawing Sheets

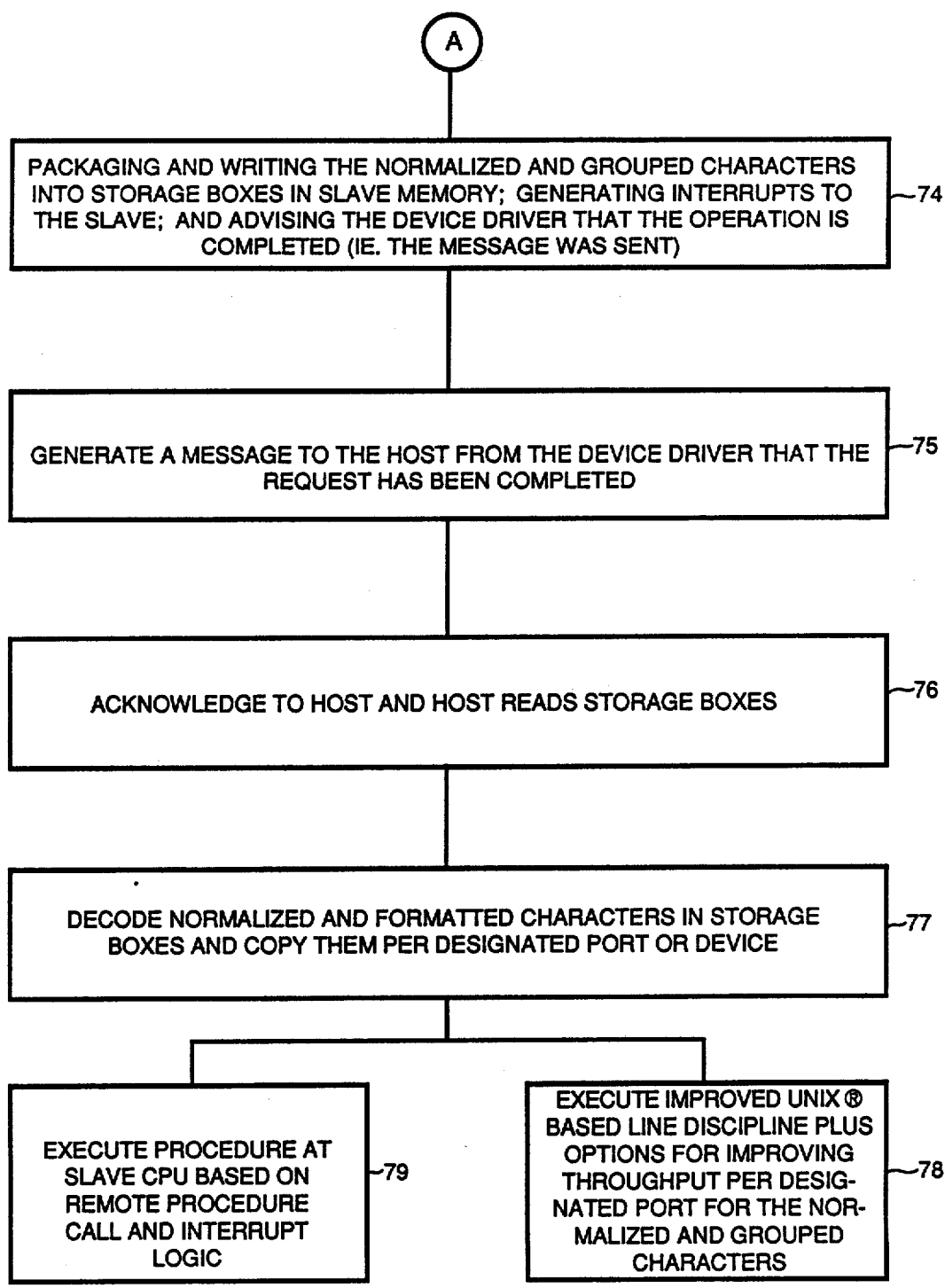

INTELLIGENT SERIAL I/O SUBSYSTEM

FIELD:

This ion relates to intelligently managing Input/Output (I/Os) devices for UNIX ® based (or its derivative) application programs running on host personal computers (PCs) interfaced with a plurality of remote serial communication devices such as terminals, and more particularly to an intelligent I/O subsystem with an expandable, flexible and compact processing and control capability controlled by an improved compatible UNIX ® line discipline submodule that eliminates host overhead irrespective of the fact that two or more UNIX ® based programs are being executed at the host at the same time and different characters are being simultaneously generated and/or displayed at remote terminals connected to the host through the I/O subsystem of the invention. In the present invention, all terminal characters (symbols whose images to be formed by the terminal represent information) are offloaded to the I/O subsystem and processed in an enhanced manner to avoid host saturation. A message handler submodule is also provided for communications between the host personal computer and intelligent I/O subsystem(s). All overheads of implementing the message passing protocol, interrupt handling, monitoring of I/O subsystem activity and sequencing and routing of messages are thereby removed form the application. Still further, a dual port memory on which is encoded a management module that includes the above-described submodules, main-lines CPU interaction. In that way, the host CPU can remain actively engaged in a series of multi-processing tasks with multiple users at the different terminals and is only interrupted when particular commands have been fully executed.

DEFINITIONS:

UNIX ® and its derivative XENIX ®, are registered trademarks of American Telephone and Telegraph and the Microsoft Corporation, respectively and comprises each a set of programs in memory for monitoring and controlling the execution of user programs in the host in a high level "C" time sharing language. Traditionally, the system kernel is written in "C" rather than assembly language. Because of being written in a high level C language, the system is portable and additionally, permits a user to execute several processes simultaneously (multiuser, multiprocessing). The system basically includes the following elements: a file system; a defined process (a single sequence of events consisting of memory and accessed files), the process being created by a copy of a process being made; and the shell command. UNIX ® and its derivates including XENIX have active licensees including The Santa Cruz Operations Inc., Santa Cruz, Calif. (SCO XENIX ®); Microport Systems Inc. Scotts Valley, Calif. (System V/AT ®) Interactive Systems Corporation Santa Monica, Calif. (AIX ®), (386/IX ®). Each of such operating systems is licensed under a known field definition which is incorporated herein by reference.

Certain additional terms and symbols used in this Application are also in need of clarification as set forth below:

Algorithm: A term used to describe a set of procedures by which a given result is obtained.

ASCII: (American National Standard Code of or Information Interchange, 1968). See USASCII.

Bus: Two or more conductors running in parallel, used for carrying information.

Byte: A sequence of adjacent binary digits operated upon as a unit-usually 8 bits.

Central Processor Unit (CPU): Part of a computer system which contains the main storage, arithmetic unit, and special register groups. It performs arithmetic operations, controls instruction processing, and provides timing signals.

Character: A symbol whose image is formed by a display system for representation of information. Examples are numerals, letters, decimal point, punctuation marks, and special symbols indicating status of an electronic system.

Clock Input: An input terminal on a building-clock typically used for receiving a timing control-clock signal, but used in some applications for a control signal or even data.

Controller: The parts (perhaps a subsystem) of a programmed system that select stored instructions, interpret them, and transmit control signals to the other parts of the system.

CPU: Central Processing Unit. A section of a computer ( or computer-like system) consisting of a controller, some registers, and an ALU.

CRT Terminal: Cathode-ray-tube terminal. A computer terminal with a screen similar to that of a television receiver, together with a keyboard.

EPROM: Erasable and programmable read-only memory. An IC memory chip whose stored data can be read at random. The data can be erased and new data can be stored, but only by a special system other than the one in which the memory is used.

Input/Output Devices (I/O): Computer hardware by which data is entered into a digital system or by which data are recorded for immediate or future use.

Interrupt: To stop a process in such a way that it can be resumed.

Line Discipline: Interprets input and output data for various characteristics.

Master-Slave: A method of connecting two flip-flops or dynamic storage units to store one bit, so that the "master" unit receives and stores an incoming bit before the "slave" unit releases a bit that was previously received by the master unit. This arrangement permits bits to be transferred between flipflops by using a common clock signal (or a common set of clock phases).

Memory: In a digital system the part of the system where information is stored.

Microcomputer: The name usually given to a small computer which uses a microprocessor for its CPU and is associated with common commercially available personal computers (PCs) such as IBM PC/AT ® and compatible microcomputers, IBM RT/PC ®, and super microprocessor driven 32-bit systems such as the IBM PS/2, all registered trademarks of International Business Machines.

Microprocessor: An IC (or set of a few ICs) that can be programmed with stored instructions to perform a wide variety of functions, consisting of at least a controller, some registers, and some sort of ALU (that is, the basic parts of a simple CPU) and commonly provided such as INTEL 80286 ® and INTEL 80386 ® both trademark INTEL, Cupertino, Calif.

Minicomputer: A computer in a certain range of size and speed, generally smaller, slower, and less sophisticated than a "computer", and is associated with midrange computing systems.

Multiprocessing: The process of having two or more programs in an execution state at the same time in a computer system.

Operating system: A set of programs which monitors and controls the execution of various user programs.

Peripheral: In a computer system, "peripheral" units or equipment are those outside the main frame, including disk and tape units, printers, keyboard terminals, etc.

PROM: Programmable read-only memory. An IC memory chip whose stored data can be read at random. The data is stored permanently by the user after the chip is manufactured, and cannot be changed afterward. Storing data in this fashion is loosely called "programming" the memory.

Register: A certain type of temporary storage unit for digital information (e.g. "Shift Register" and "Parallel Register.")

ROM: Read-only memory. A memory unit containing data permanently stored when the unit was manufactured. Usually an IC chip with each bit stored as a permanent electrical connection of some sort, which can be read at random.

Serial Data Transmission: Two or more bits of a group are said to be transmitted "in series" when one at a time is transmitted through the same wire. Such transmission is called "serial" transmission.

Static Memory: An IC memory whose storage elements consist of flip-flops rather than dynamic storage units.

Subsystem: A smaller system inside a larger system. Each subsystem can be thought of as a separate system with its own job to do.

Terminal: A computer terminal is an input (usually a keyboard) or output device (usually a printer or CRT screen) operated by a person.

Top-down design: A systematic procedure for problem solving which consists of first specifying a problem solution in rather board or general terms (the top level). The next level and each succeeding level involves a more detailed solution until no more detail is necessary.

Word: A group of bits handled as a unit usually stored at a certain address in a RAM.

UNIX ®: Is a trademark of American Telephone & Telegraph Company and is an operating system for computers characterized by operation that monitors and controls the execution of various user programs in a host computer in a modular "C" time share programming fashion. The kernel is written in "C" rather than assembly language.

BACKGROUND:

Since 1984, processing power of microprocessor-driven, host personal computers have increased fourfold because of improvements in processor and disk technologies. Cached memory and full 32 bit data path capability, have contributed to the increase, as has the improvement in disk access times, from say 45 msec seek times to 17 msec using presently available disk drives.

I/O controllers and subsystems have also evolved to accommodate increased terminal loads and higher data rates. Examples of such I/O controller and I/O subsystems are described in the literature, and include:

(a) U.S. Pat. No. 4,162,520 for "Intelligent Input-Output Interface Control for Input-Output Subsystem" describing the peripheral-controller known as a line control processor which controlled and handled data transfers between a given peripheral terminal unit and the main host system;

(b) U.S. Pat. No. 4,074,352 for "Modular Block Unit for I/O Subsystem" describing a base submodule unit which housed and supported a group of eight peripheral-controllers and interfaced to a main host computer system;

(c) U.S. Pat. No. 4,106,092, for "Interface System Providing Interfaces to Central Processing Unit and Modular Processor-Controllers for I/O Subsystems" describing a unit in the main host system, designated as an I/O translator or "IOT", which controls and regulates data transfer between the main host system and a plurality of base submodules and their peripheral-controllers; and (d) U.S. Pat. No. 4,189,769, for "Input/Output Subsystem for Digital Data Processor System", describing a subsystem wherein a plurality of peripheral-controllers are organized in base submodules for data communications with a main host system. The peripheral-controllers and the base submodule form an input-output subsystem for controlling data transfers to/from a large number of peripheral units to the main host computer system;

While the aforementioned I/O subsystems have enjoyed success, their complexed implementation sometimes have been carried out at the expense of large host overhead (normalized CPU time devoted to manage and coordinate operations) and poor throughput. Moreover many such subsystems have been in use in connection with conventional disk operating systems (DOS) and, as such, are not easily adapted for use in UNIX ® operating environments where the host computer is a personal computer interfaced with a plurality of remote serial communicating devices.

SUMMARY:

In accordance with this invention an improved I/O intelligent subsystem is provided. Its attributes: intelligently managing Input/Output (I/Os) devices for UNIX ® based (or its derivative) application programs running on host personal computers (PCs) interfaced with a plurality of remote serial communication devices such as terminals, and more particularly to an intelligent I/O subsystem with an expandable, flexible and compact processing and control capability controlled by an improved compatible UNIX ® line discipline submodule that eliminates host overhead irrespective of the fact that two or more UNIX ® based programs are being executed at the host at the same time and different characters are being simultaneously generated and/or displayed at remote terminals connected to the host through the I/O subsystem of the invention. In the present invention, all terminal characters (symbols whose images to be formed by the terminal represent information) are off-loaded to the I/O subsystem and processed in an enhanced manner to avoid host saturation. A message handler submodule is also provided for communications between the host personal computer and intelligent I/O subsystem(s). All overheads of implementing the message passing protocol, interrupt handling, monitoring of I/O subsystem activity and sequencing and routing of messages are thereby removed form the application. Still further, a dual port memory on which is encoded a management module that includes the above-described submodules, main-lines CPU interaction. In that way, the host CPU can remain actively engaged in a series of multi-processing tasks with multiple users at the different terminals and is only interrupted when particular commands have been fully executed.

In accordance with apparatus aspects, the I/O subsystem comprising a series of modular subassemblies (slave boards) each of which includes a microprocessor such as an INTEL 80186, an external dual ported RAM on which is encoded the above-described management module of the invention, and finally, a serial communicating interface means. By programming the dual ported memory with at least the improved UNIX ® baseline discipline submodule, expanded, flexible and compact processing and control capabilities that eliminate host overhead are provided by steps that include:

(a) Checking the output character(s) being processed for a "most common output mode", such characteristics being associated with "cooking". If the common mode is detected by cross checking with a pre-set mode setting, none of the standard line discipline functions are invoked against the character(s) to be processed. Instead, a series of table driven assembly language processing steps are called to process the character(s) rapidly to speed throughput (called "Speed-put");

(b) Polling memory queues for blocks of stored characters (output mode) and execute the request represented by characters at full line speed; and (c) Prioritizing all processing of input character(s) (input mode) so that irrespective (within RS232 limits) of character serial line rate, sufficient storage in queue is available. High bursts of input characters thus can be processed as occurring in machine-to-machine serial data links. Routines are called, which speed movement of the characters from the queues to the particular mailboxes that requires input data from the selected port. This means full speed machine file transfer can occur without degradation associated with constant handshaking. In addition, except for step (a) supra, standard line discipline functions can also be invoked as required in "raw" and "canonical" modes in association with input and output serial characters.

In accordance with another aspect, a host request is provided in a form that bypasses the host UNIX ®-based operating system terminal management, yet permits the slave board designated to rapidly comply and signal the host when the task is completed. In accordance with still yet another aspect, a message handling submodule is provided that quickly and efficiently interprets all messages between the PC host and any number of slave boards and presents a high level interface to programs received on the host. In that way, overhead related to implementing message passing protocol, interrupt handling, monitoring different slaves, sequencing and routine of messages, is removed from the host computer.

UNIX ® was originally designed as a portable operating system C (o/s) and archaic modes for terminals are often used for supporting lower to upper case mapping; also a myriad of fill/delay character options also impose large constraints. Moreover, it is also necessary to support tab expansion, timeouts, etc., and terminal performance could be burdened. Furthermore, a non-intelligent I/O subsystem could be very sensitive to interrupt level control. A device driver which disables hardware interrupts to the system could only do so for a very short duration. Failure would mean at least the clock would run slow, and more importantly vital devices such as the hard disk would be unable to receive timely service of requests.

The primary (though not dominant) cause of terminal overhead is the processing of hardware interrupts for each character. The operating system must save the current system state, examine the hardware interrupt, output/input the next character, then restore the system state and return. At 9600 baud, this occurs roughly every millisecond. If the main CPU passes large chunks of data (e.g. IKB bytes) to and from the I/O subsystem, and the subsystem manages all character interrupts, substantial performance gains can be achieved. The host microprocessor will be interrupted infrequently, resulting in less CPU being consumed for a given I/O task.

Another dominant factor contributing to output overhead, relates to the task of testing processing of each character, against line discipline functions and checking for all possible output modes. However, just as output "cooking" (as this process of testing and processing of each character and checking for all possible output modes, is known) can consume up to 30% of the main CPU it is potentially a serious bottleneck within the subsystem itself. In this regard, experience has shown that unless the routines are carefully tailored, this processing will saturate the subsystem very quickly.

Other pitfalls in I/O subsystem design relate to not correctly assessing the sensitivity of UNIX ® and derivative operating systems to the interrupt control level. Such systems C have been found to be sensitive to given interrupts. Polling to check for incoming/outgoing characters, may not be the answer, since unusually long system interrupts that slow the host clock substantially, can occur.

Another pitfall for intelligent subsystems is software reliability. The UNIX ®-based serial character processing must be accurately maintained to ensure integrity of operation.

In the present invention, the I/O subsystem is programmed to minimize interrogations of the host computer except for a limited number of commands, that is, except for system interrupts triggered by special keys entered by the user. Otherwise, the host is free.

All rub-outs at the remote terminal local echoes and flow control signals (X-ON, X-OFF) are handled by the I/O subsystem of the invention. For raw data, the subsystem provides the support protocols related to tuning and sizing the input entries. Because of the fact that UNIX ® and XENIX are critically sensitive to interrupt level control, the subsystem of the present invention provides a message handling submodule that is independent of the host, imposes minimum overhead and generates device interrupts without polling its associated ports to check for incoming or outgoing characters. Hence throughput over a substantial number of ports, is surprisingly high. Absolute priority is devoted to receive interrupts. When a receive interrupt is received, the I/O subassembly performs no further character processing. Consequently, function keys and other very high burst data rates can be used with no data loss. To further enhance communications, the flow control commands, X-ON/X-OFF related to receive special treatment and response occur within two characters.

Traditional UNIX ®/XENIX based operating systems suffer because of the number of input and output modes available for terminals. For each character output, many pages of "C" code are traversed. The I/O subassembly of the invention reduces this overhead by having dedicated routines related to the most common output/input modes. "Speed-put" is one such routine in which table driven and straight line assembler techniques are used. If the user selects certain options as the only output modes, "Speed-put" is called, yielding dramatic reductions in overhead.

BRIEF DESCRIPTION OF THE DRAWINGS:

FIGS 5A, 5B 6–11 illustrate processing steps in accordance with improved dual port memory management module in residence.

DETAILED DESCRIPTION OF THE BEST MODE OF THE INVENTION:

The following is a detailed description of preferred embodiments of the present invention and is presented by way of example only and is not intended to limit its applicable principles. Furthermore, the description is intended to clearly enable one skilled in the art to make and use the invention. It also includes various adaptations, variations, alternatives and different uses of the invention including what is presently believed to be the best mode of carrying out the invention.

Figure 1:
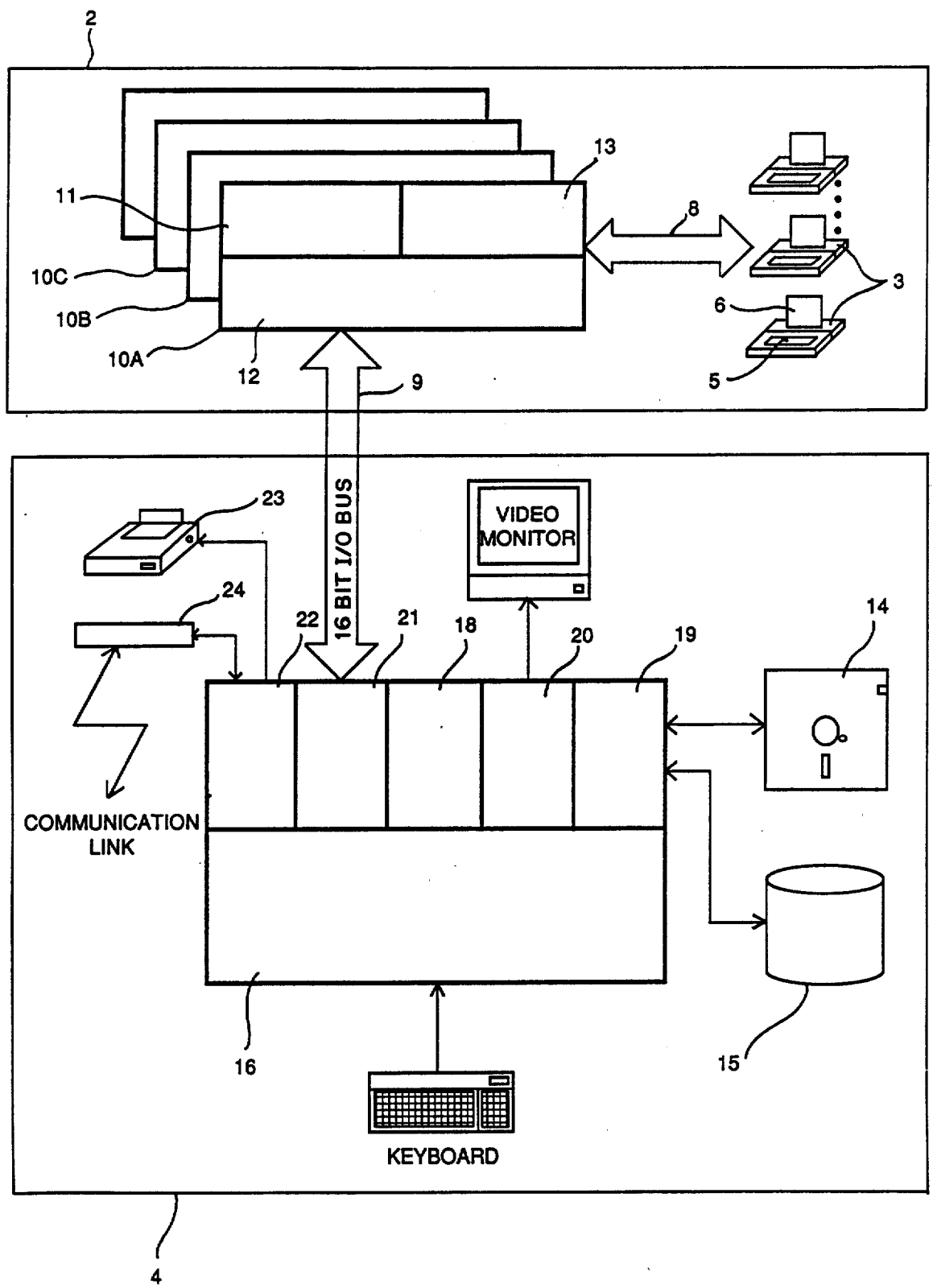
FIG. 1 is a schematic diagram of a PC host operationally connected to a plurality of serial devices through I/O subsystem of the invention.

FIG. 1 shows a I/O subsystem 2 of the present invention in association with a series of terminals 3. The terminals 3 communicate with a host computer 4 of the personal computer (PC) type. The host computer 4 supports a series of UNIX ® based (or its derivatives) applications to be run by users at the terminal 3 in a multiprocessing and multiuser mode.

Each terminal 3 has at least a keyboard 5 and a monitor 6 although on-site printers and other peripherals including additional personal computers can be added.

The I/O subsystem 2 includes a series of I/O subassemblies 10a, 10b... each of which has a series of ports dedicated to the user terminals 3 on a one-to-one basis. Each I/O subassembly 10a, 10b... has a modem or direct link B to the terminals 3 and connection to the host computer 4 via system bus 9. Each I/O subassembly 10a... also includes a CPU 11 that includes internal memories (not shown), a dual ported RAM memory 12 and a serial communicating ports 13. As explained below, each I/O subassembly 10a, 10b... supports floppy disk and fixed disk drives 14, 15 of the host 4 and the keyboard 5 and monitor 6 of each of the terminals 3.

The host computer 4 communicates with the I/O subsystem 2 via a system bus 9, and includes a CPU 16, a memory 18, a disk controller 19, a video controller 20, an I/O expander 21, and ports 22 connected to a printer 23 or to a modem 24 or the like.

In operation the serial ports 13 of each I/O subassembly 10a, 10b... allows keystrokes signals from the terminal 3 to be transmitted to the subassembly 10a, 10b... for interpretation and enhancement and then retransmitted to the terminal 3 or to the host PC4, as required, with improved throughput along with the complete elimination of character management by the host 2.

Figure 2:
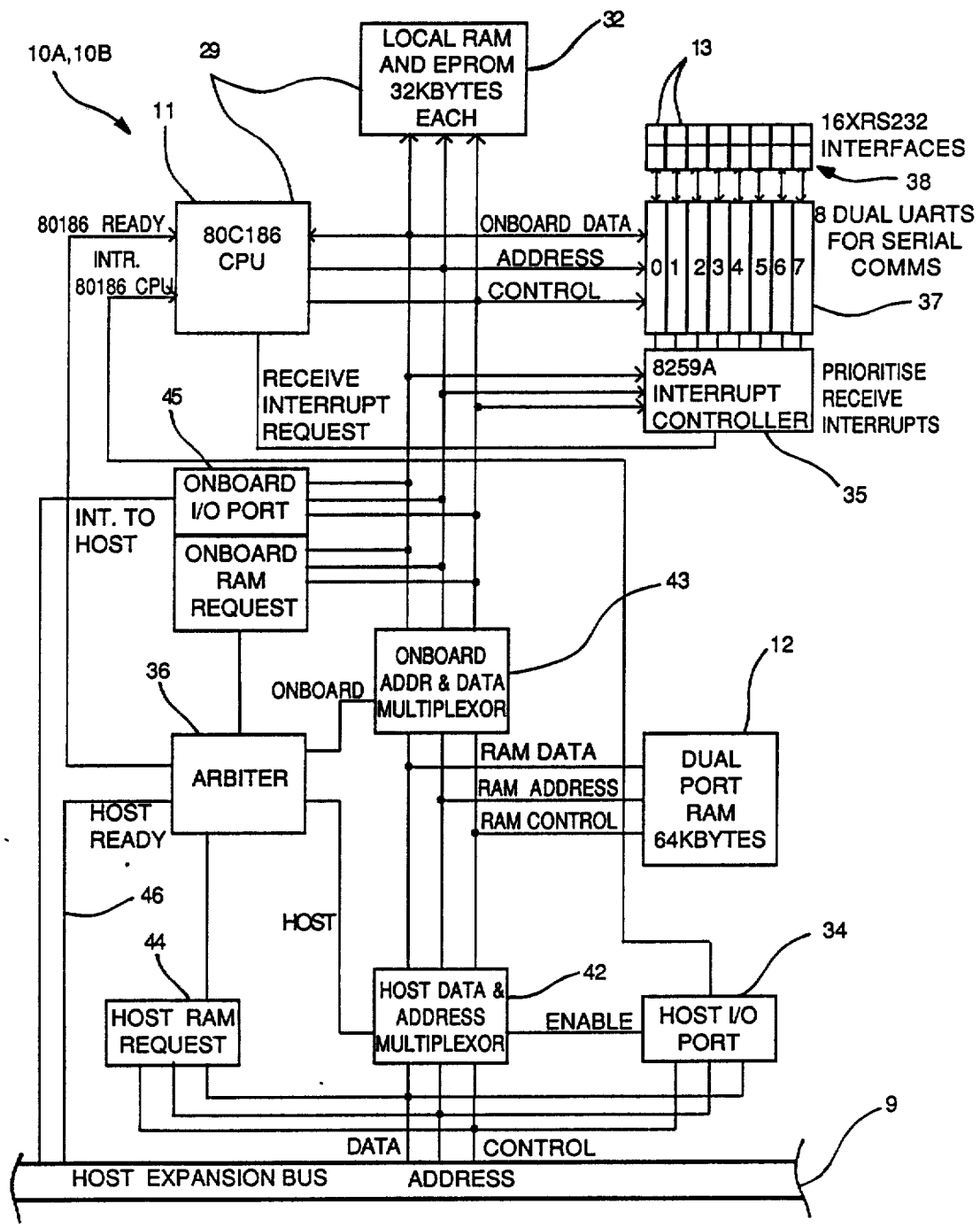
FIG. 2 is a schematic of the I/O subsystem of FIG. 1 that includes a microprocessor and dual asynchronous receiver/transmitters (DUARTS)

FIG. 2 shows I/O subassemblies 10a, 10b... in greater detail.

As shown each I/O assembly 10a, 10b... includes an INTEL 80186 microprocessor 29. The microprocessor 29 comprises the CPU 11, and a local chip selectable memory 32. The CPU 11 controls a series of the asynchronous controllers generally indicated at 37 and includes the following:

(a) A host interrupt from host I/O subcontroller 34;

(b) An interrupt request from internal controller 35 programmed to prioritize receive interrupts; and (c) A ready acknowledge from the RAM arbiter subcontroller 36.

The CPU in turn connects a plurality of dual serial asynchronous receiver/transmitter (DUARTS) 37 and an interface driver 38 defining ports 1, 2...n connected to terminals (not shown) where n is a minimum of 1 and a maximum of 16.

The dual ported memory 12 is segmented to be encoded with a management module that provides instructions for effectively managing operations (as explained below) as well as providing storage for messages arriving via system bus 9. The memory 12 is operationally connected to host (address data) multiplexer 42 controlled by arbiter 36. Mailboxes within the dual memory 12 can be accessed by CPU through on-board multiplexer 43. Host I/O port and host RAM requests are handled by subcontrollers 34 and 44, respectively. On board I/O port and RAM requests are handled by subcontroller 45.

External interrupts are handled by the microprocessor 29 and interrupt controller 35. Chip select and wait state generation logic are generated by the microprocessor 29 as required with 7 I/O selects, 2 wait states available for peripherals via chip enables.

The Dual Memory 12 consists of eight 8 KB × 8 static RAMS arranged as sixteen bit devices. As the memory 12 can be accessed by both CPUs of the host and I/O subassembly, the arbiter 36 is needed to control the multiplexers 42 and 43 as required. Synchronization is provided by the arbiter 36 which can insert wait states into memory cycles to transparently manage data flow, say until the dual port memory 12 is no longer busy. Memory cycles are usually at a zero wait state unless there is a clash with a host request and the host is granted access via line 46.

The internal memories 32 are not dual ported. The internal RAM incorporates four 8K × 8 static RAM chips. This memory operates with no wait states. The internal ROM comprises two 16K × 8 devices having access times of 200 ns allowing wait free operations. Encoded on memory is a power-on diagnostics routine and a self-confidence routine, the following user invokeable diagnostics are also provided on diskette:

(a) A Presence Test- Which acknowledges that the host 4 can interrogate the I/O subsystem 2 and that the CPU 11 is functioning;

(b) A Simple Dual Port RAM Test- Which ensures that the host 4 is able to read messages sent by the I/O subsystem 2 via the dual port RAM 12;

(c) A Interrupt Out Test-Which tests whether the PC host 4 can interrupt the I/O subsystem 2 to send data and control etc.;

(d) A Simple RAM Test With I/O Subsystem 2 Activity-Which is necessary for the dual memory 12 to be accessible by CPUs of the I/O subassembly and the host. This test checks to ensure both CPUs 11 and 16 can access the dual memory 12 via the arbiter 16 without corruption;

(e) A Port Checkout-Which requires the user to install a loop-back plug on each port. This 9 pin D plug has diagnostics to test that input and output signals are functioning and that the cable connections are complete; and (f) When first invoked the Port Checkout test will fail as no loop back plug ensures that no adjacent wires on the cables are shorted together or any pins on the panel are shorted together. Each port can be individually tested by returning to the main menu and selecting the Cable Loopback Test.

The latter-cited statistics routine can interrogate the dual ported memory mailboxes 12 on a per processing event basis, to provide statistics as to:

(a) The number of characters exciting from the dual memory 12;

(b) The number of messages from the host 4;

(c) The number of messages from the I/O subsystem 2;

(d) The number of acknowledgements logged;

(e) The time per acknowledgment;

(f) The number of modem interrupts;

(g) The number and the status of modem handshakes; and (h) The number of I/O subassembly X-ON, X-OFF Control of the DUARTS 37 by the internal interrupt controller 35 provides the following I/O map:

| Device | Base Address |
| --- | --- |
| DUART 0 | 0000 |
| DUART 1 | 0080 |
| DUART 2 | 0100 |
| DUART 3 | 0180 |
| DUART 4 | 0200 |
| DUART 5 | 0220 |
| DUART 6 | 0240 |
| DUART 7 | 0260 |
| INTERRUPT CONTROLLER | 0280 |
| HOST INTR OUT | 0300 |
| CPR-100 | FF00 |

There are 12 possible sources of external maskable interrupts on the I/O subassembly 10a. The interrupt assignment is as follows:

IRQ0—Interrupt message form host
IRQI—INT from external interrupt controller
IRQ3—Interrupt acknowledge to the interrupt controller
NMI—Interrupt invokes debug monitor One of the CPU interrupts is assigned to the incoming host message interrupt. The other two interrupts are used as INT and INTA for the interrupt controller 35. The internal interrupt controller 35 is programmable to prioritize the interrupts generated by the DUARTS 37.

At interface 38 there are associated drivers and receivers. Each signal has an associated driver or receiver. The following signals are supported at 38:

| Pin Number | Signal |
| --- | --- |
| 1 | Not used* |
| 2 | Receive Data |
| 3 | Transmit Data |
| 4 | Data Terminal Ready |
| 5 | Signal Ground |
| 6 | Data Set Ready |
| 7 | Request To Send |
| 8 | Clear to Send |

-continued

| Pin Number | Signal |
| --- | --- |
| 9 | Not used* |

Figure 3:
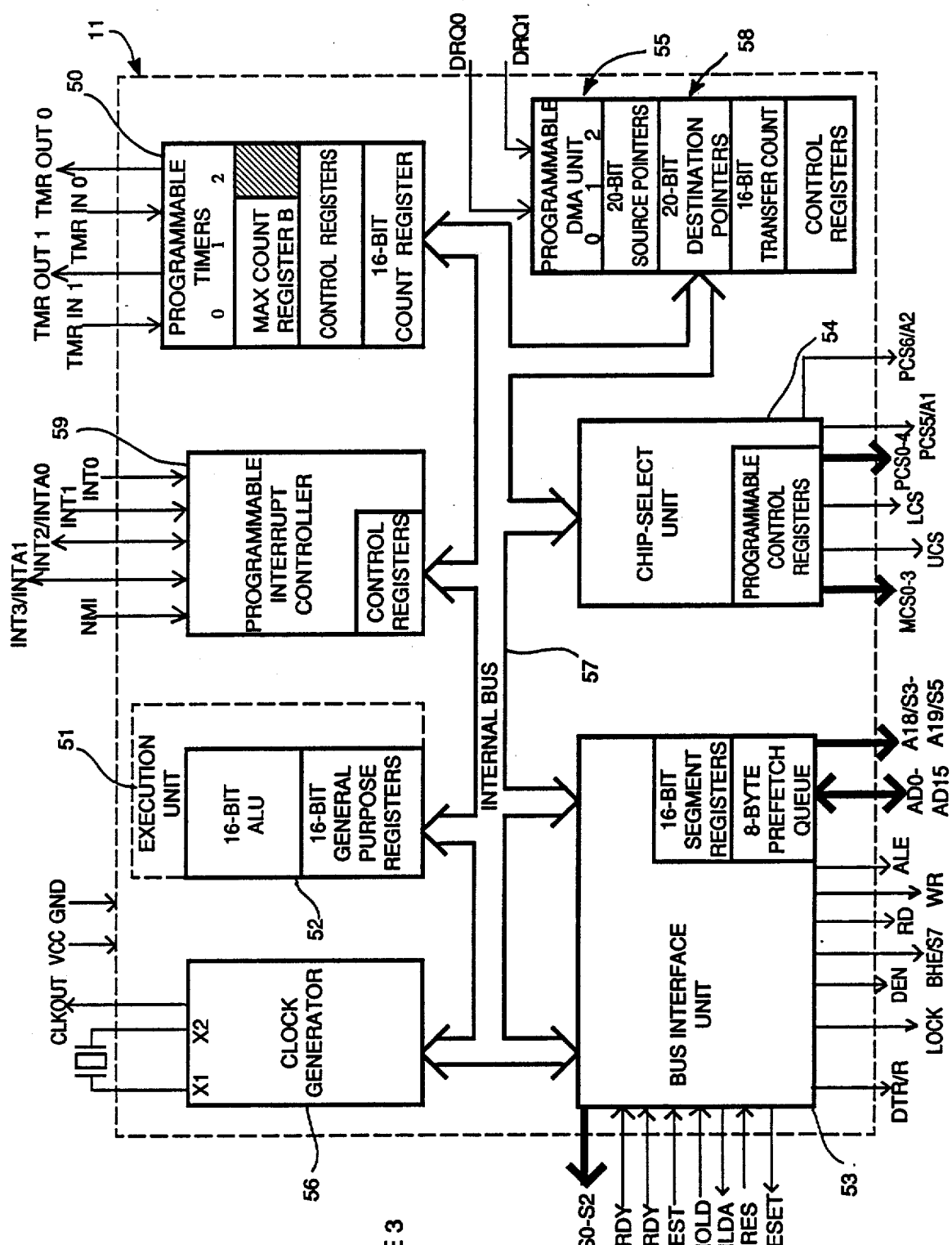
FIG. 3 is a block diagram of the microprocessor of FIG. 2.

*Pin 1 is Carrier Detect and Pin 9 is Ring Indicator. These signals are normally required for modem status and are not required when connecting terminals directly. Should you require a remote terminal to be connected via a modem, Carrier Detect can be strapped to the DSR line FIG. 3 illustrates microcomputer 29 in more detail. As shown, the CPU includes an array of registers generally associated with different units within the microcomputer, such as: a programmable timer 50, programmable controller 59, execution unit 51 with ALU 52, bus interface unit 53, chip select unit 54 and programmable DMA unit 55. A clock generator 56 paces operations where information flows via internal data bus 57. The registers are temporary storage areas. Program registers within chip select unit 54 have dedicated uses; the other registers, have more general uses. The many registers are useful in manipulation of data since they eliminate the need to shuffle results back and forth between the external memory units. In practice most ALUs 52 also provide other built-in functions, including hardware subtraction, boolean logic operations, and shift capabilities. The ALU 52 also can utilize flag bits which specify certain conditions that arise in the course of arithmetical and logical manipulations. Flags typically include carry, zero, sign, and parity. It is possible to program jumps which are conditionally dependent on the status of one or more flags as previously mentioned. Thus, for example, the program may be designed to jump to a special routine if a flag is set following an instruction.

Instructions making up the program for operations are stored in the dual memory 12 of FIGS. 1 and 2. The program is operated upon in a sequential manner except when instructions in the memory call for special commands such as "jump" (or "call") instructions. The program follows system boot and does not reside permanently within the dual memory 12. While the program associated with the present invention is a relatively straight forward one, hence avoiding most "jump" instructions, a system call instruction as set forth below is important and is utilized as described. In "call" instructions, the CPU has a special way of handling subroutines in order to insure an orderly return to the main program. When the CPU 11 receives a call instruction, it increments the program counter and notes the counter's contents in a reserved memory area of the memory unit known as the "stack".

CPUs have different ways of maintaining stack contents. Some have facilities for the storage of return addresses built into the CPU itself; other CPUs use a reserved area of external memory as the stack and simply maintain "pointer" registers, such as shown at 58, which contains the address of the most recent stack entry. The stack thus saves the address of the instruction to be executed after the subroutine is completed. Then the CPU 11 loads the address specified in the call into its program counter. The next instruction fetched will therefore be the first step of the subroutine. The last instruction in any subroutine is a "return". Such an instruction need specify no address.

Figure 4:
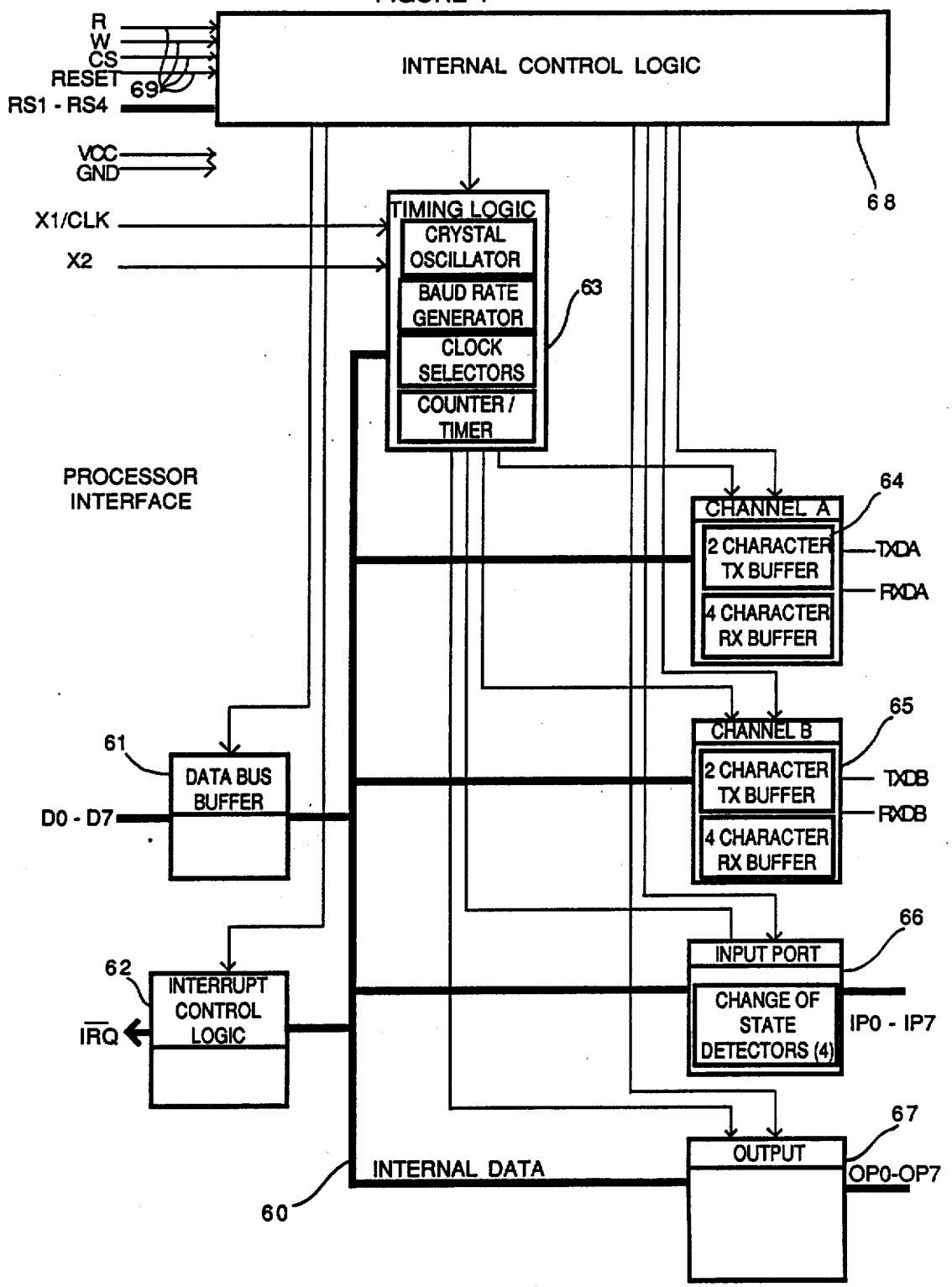
FIG. 4 is a block diagram of the DUARTS of FIG. 2.

FIG. 4 illustrates DUARTS 37 in more detail. Since the DUARTS 37 are well known only the highlighted functions of such devices will be presented below., Data line 60 is seen to be controlled by data bus buffer 61, interrupt control logic 62 and clock selector 63. Hence data on the line 60 passes by way of C channel buffers 64, 65 to input and output ports 66 and 67. Additional control functions can be provided by Rs1-Rs4 signals to control logic unit 68 and by the various pulse states signals on lines generally indicated at 69. The purpose of such signals is to provide the correct synchronization of operations so that serial characters entering and leaving ports 66, 67 maximize from throughput and remove character management form the host.

OPERATIONS:

Returning to FIG. 1, note that a terminal 3 normally operates in full duplex mode and can be actuated by the act of merely opening a file. That procedure normally causes the process to wait until a connection is established. When the files are opened they become a user's standard input, output, and error files. Usually the first newly opened terminal file is generated by a process group leader. That terminal then becomes the control terminal. By acting as a control terminal, the remaining terminals are queued behind the former. But as discussed below, the control terminal can be inherited by another, via say a fork command. Information at the terminal 3 is permitted to pass in two directions simultaneously. Hence, characters may be typed at the terminal 3 at any time, even while output is occurring, and are only lost when the system's character input buffers become completely full, which is rare. Or when the user has accumulated the maximum allowed number of input characters that have not yet been read by some program, say 256 characters. When the input limit is reached, all the saved characters are dumped without Characters generated at the terminals 3 are processed in units of lines. A line is delimited by a new-line character (ASCII LF), an end-of-file (ASCII EOT) character, or an end-of-line character. This means that a program attempting to read, can be suspended until an entire line has been typed. Also, no matter how many characters are requested in the read call, at most one line will be returned. It is not, however, necessary to read a whole line at once any number of characters may be requested in a read, even one, without losing information.

Certain characters have special functions on input and these functions and their default character values are summarized as follows:

INTR (Rubout or ASCII DEL) generates an interrupt signal which is sent to all processes with the associated terminal. Normally, each such process is forced to terminate, but arrangements may be made either to ignore the signal or to receive a trap to an agreed-upon location;

QUIT (Control-1 or ASCII FS) generates a quit signal. Its treatment is identical to the interrupt signal except that, unless a receiving process has made other arrangements, it will not only be terminated but a core image file (called core) will be created in the current working directory.

SWITCH ASCII, SM NUL is used by the job control facility, shl, to change the current layer to the control layer.

ERASE (#) erases the preceding character. It will not erase beyond the start of a line, as delimited by a NL, EOF, or EOL character.

KILL (@)deletes the entire line, as delimited by a NL, EOF, or EOL: character

EOF (Control-d or ASCII EOT) may be used to generate an end-of-file from a terminal. When received, all the characters waiting to be read are immediately passed to the program, without waiting for a new-line, and the EOF is discarded. Thus, if there are no characters waiting, which is to say the EOF occurred at the beginning of a line, zero characters will be passed back, which is the standard end-of-file indication.

NL (ASCII LF) is the normal line delimiter. It can not be changed or escaped.

FOL (ASCII NUL) is an additional line delimiter, like NL. It is not normally used.

STOP (Control-s or ASCII DC3) can be used to temporarily suspend output. It is useful with CRT terminals to prevent output form disappearing before it can be read. While output is suspended, STOP characters are ignored and not read.

START (Control-q or ASCII DC1) is used to resume output which has been suspended by a STOP character. While output is not suspended, START characters are ignored and not read. The start/stop characters can not be changed or escaped.

The character values for INTR, QUIT, SWITCH, ERASE, KILL, EOF, and EOF characters may be escaped by a preceding/character, in which case no special function is done.

OPERATIONAL CHARACTERISTICS OF TERMINALS 3:

When the user writes one or more characters at one of the terminals 3 the characters arrive at the I/O subsystem of the invention in serial order. Input characters are echoed back by putting them in the output queue. If the process produces characters more rapidly than they can be typed, so that when the output queue exceeds a limit, the process will be suspended. When the queue has drained down to a threshold value, the program instructions are resumed.

Several system calls apply to terminal files. The primary calls are defined in a <terminal0.b> format and have several structures related to input modes, output modes, control modes, local modes, line discipline and control characters.

System input call are special control characters defined by a 8-bit array, the relative positions and initial values for each function being as follows:

| 0 | VINTR    | DEL |
| 1 | VQUIT    | FS  |
| 2 | VERASE   | #   |
| 3 | VKILL    | @   |
| 4 | VEOF     | EOT |
| 5 | VEOL     | NUL |
| 6 | reserved |     |
| 7 | SWITCH   | NUL |

The 8-bit field code (of the system input calls) describes the basic terminal input control:

| IGNBRK | 0000001 | Ignore break condition. |
| BRKINT | 0000002 | Signal interrupt on break. |
| IGNPAR | 0000004 | Ignore characters with parity errors. |
| PARMRK | 0000010 | Mark parity errors. |
| INPCK  | 0000020 | Enable input parity check. |
| ISTRIP | 0000040 | Strip character. |
| INLCR  | 0000100 | Map NL to CR on input. |
| IGNCR  | 0000200 | Ignore CR. |
| ICRNL  | 0000400 | Map CR to NL on input. |
| IUCLC  | 0001000 | Map uppercase to lowercase on input. |
| IXON   | 0002000 | Enable start/stop output control. |
| IXANY  | 0004000 | Enable any character to restart output. |

| | | -continued |
|---|---|---|
| IXOFF | 0010000 | Enable start/stop input control. |

In operation, if a IGNBOR code isentered, the break is ignored (not put on the open queue) and therefore not read by the process. Otherwise if BRKINT is set, the break condition will generate an interrupt signal and flush both the input and output queues. If IGNPAR is set, characters with other framing or parity errors are ignored.

If PARMRK is set, a character with a framing or parity error (which is not ignored) is read as the three-character sequence: 0377, 0, X, where X is the data of the character received in error. To avoid ambiguity, if ISTRIP is not set, a valid character of 0377 is read as 0377,0377. If PARMRK is not set, a framing or parity error (which is not ignored) is read as the character NUL (0).

If INPCK is set, input parity checking is enabled. If INPCK is not set, input parity checking is disabled. This allows output parity generation without input parity errors.

If ISTRIP is set, valid input characters are first stripped to 7-bits, otherwise all 8-bits are processed.

If INLCR is set, a received NL character is translated into a CR character. If IGNCR is set, a received CR character is ignored (not read). Otherwise if ICRNL is set, a received CR character is translated into a NL character.

If IUCLC is set, a received uppercase alphabetic character is translated into the corresponding lowercase character.

If IX-ON is set, start/stop output control is enabled. A received STOP character will suspend output and a received START character will restart output. All start/stop characters are ignored and not read. If IXANY is set, any input character, will restart output which has been suspended.

FLOW DIAGRAM OF THE INVENTION:

If IX-OFF is set, the system will transmit START/-STOP characters when the input queue is nearly empty/full.

Figure 5A:
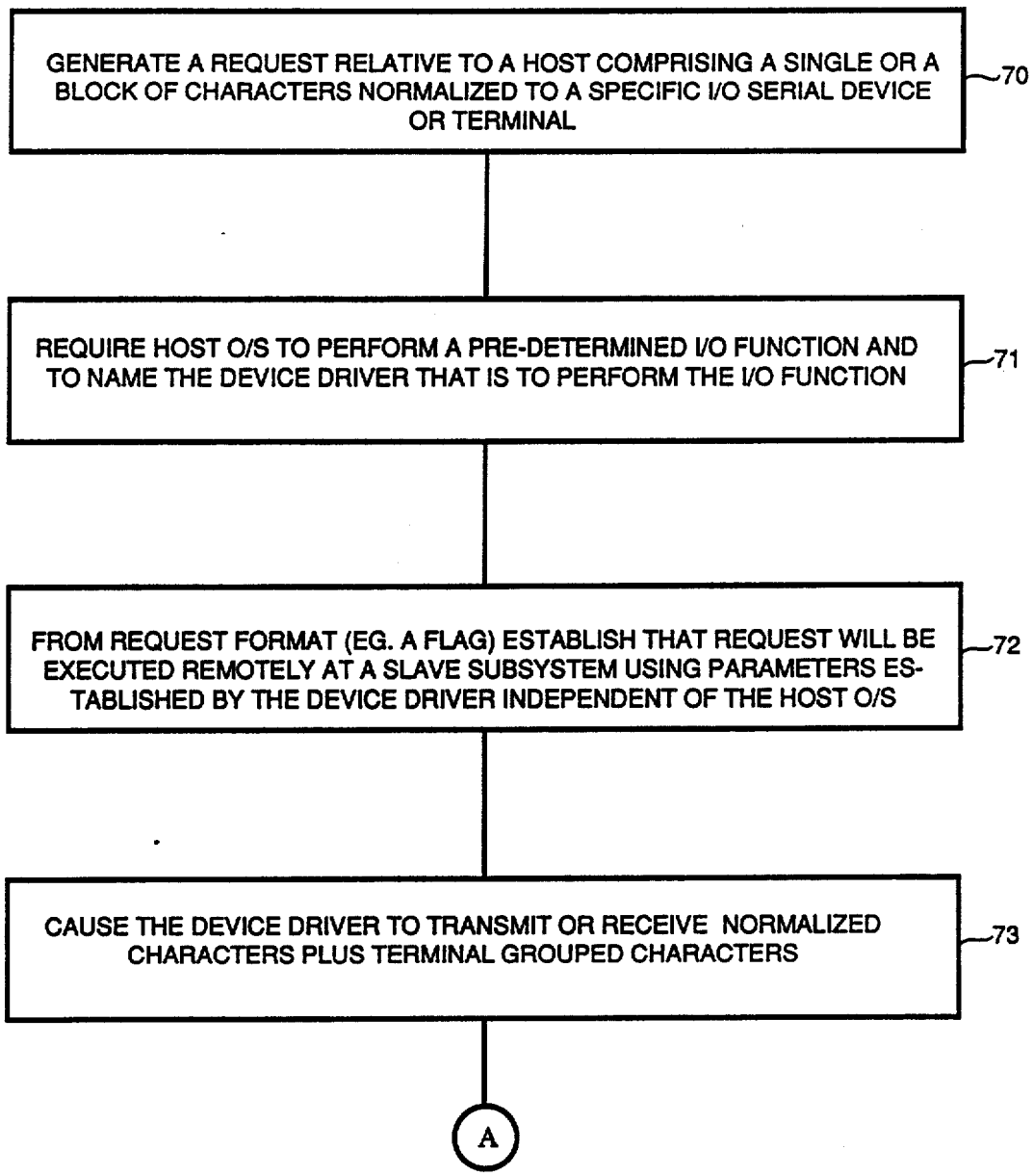

FIGS. 5a and 5b show a flow diagram illustrating the operations of the I/O subsystem 2 of the present invention. Preliminary to the operations, assume that the I/O subsystem has been installed and its integrity cross-checked in the manner previously described. The steps of FIGS. 5a and 5b include generating a request relative to the host computer at 70 in either an input or output mode. The request 70 comprises either a single or a block of characters classified as a function of a specific I/O serial device or terminal ("normalized characters"). Next, the host UNIX ® based on a derivative operating system (O/S), is required to perform a predetermined I/O function at 71 and to name the device driver that is to perform that I/O function. From the request format which contains a flag, the device driver of the host determines at step 72 that the request must be executed remotely at a slave subassembly using parameters established by the device driver. Such determination is independent of remainder characteristics of the host O/S.

Next, at step 73 the device driver of the host is caused to C transmit or receive the normalized characters plus terminal format characters. The latter have to do with mapping the carriage feed (e.g. 80±characters and carriage return); expansion of tab setting; pausing at end of lines for printing; checking for modem off-hook status and checking for special characters which (a) terminate application program, (b) erase characters or lines of characters and (c) change terminal speed rate dynamically, etc.

The next step 74 relates to packaging and writing the normalized and grouped characters into mailboxes in the dual ported slave memory 12 of FIGS. 1 and 2. An interrupt to the slave subassembly is generated; finally the device driver is advised that the operation is complete; i.e., the message was sent.

In packaging the data in step 74, the normalized and grouped characters are stored by device number. Such group packets save operational time. Writing of the characters in step 74 is aided by the fact that the dual memory 12 is segmented by mailbox number equal to the number of ports, with two additional mailboxes related to special characteristics, see FIG. 10. The port mailbox is further divided into a transmit space for the characters, a receive space for the same and a control space for the terminal format characteristic. One of the special boxes in step 74 is a space for an acknowledgement (from or to the I/O subassembly) that the message was sent. Thus when the host interrogates the acknowledgement space, the host will receive the acknowledgement. Another of the special boxes in step 74 provides statistic data acted upon by the microprocessor as previously mentioned. That data is fetched from the mailboxes by the slave and then operated on in accordance with the statistic making instructions.

Next, at step 75 a message is generated to the host from the slave that the request has been completed. Then at step 76 a typical UNIX ® decode step occurs in which a message handler submodule in dual ported memory 12 of FIGS. 1 and 2 copies an acknowledgement to a segmented mailbox. Such acknowledgement is read by the host on the next scanning cycle. Next at step 77, the normalized and grouped characters are decoded per threesegments per designated port as before, and the normalized blocks of characters are extracted. Finally at step 78, the normalized characters are processed in an improved UNIX ® based line discipline submodule substantially equal to that residing within the PC host plus options. By programming the dual ported memory with at least the improved UNIX ® baseline discipline submodule, expanded, flexible and compact processing and control capabilities that eliminate host overhead are provided by steps that include:

(a) Checking the output character(s) being processed for a "most common output mode", such characteristics being associated with "cooking". If the common mode is detected by cross checking with a pre-set mode setting, none of the standard line discipline functions are invoked against the character(s) to be processed. Instead, a series of table driven assembly language processing steps are called defined by a common mode assembly language submodule to process the character(s) rapidly to speed throughput (called "Speed-put"). Such processing is characterized by an absence of "C" language lists, tables or programs;

(b) Polling memory queues for blocks of stored characters (output mode) and interpreting how to execute the request represented by characters at full line speed. Such processing is carried out by a queue polling submodule that interrupts how to efficiently execute serial message requests at full line speed; and (c) Prioritizing all processing of input character(s) (input mode) so that irrespective (within RS232 limits)

of character serial line rate, sufficient storage in queue in RAM 12 is available. This type of processing is preferably carried out by a prioritizing submodule that allocates storage in RAM 12. C High bursts of input characters thus can be processed as occurring in machine-to-machine serial data links. Routines are called, which speed movement of the characters from the queues to the particular mailboxes that requires input data from the selected port. This means full speed machine file transfer can occur without degradation associated with constant handshaking. In addition, except for step (a) supra, standard line discipline functions can also be invoked as required in "raw" and "canonical" modes in association with input and output serial characters.

While standard line discipline steps and operations will be discussed in greater detail below suffice to say at this time that UNIX ® (or its derivative) the standard line discipline submodule of the invention has two modes of operation.

In the canonical form, the line discipline function converts raw data sequences typed at the keyboard to a form which UNIX ® can use to issue commands or input these characters to user programs. The line discipline also converts raw output sequences written by a program to a format that the user expects on the terminal. In the raw mode the line discipline submodule passes data between programs and the terminals without such conversions. In canonical mode, the line discipline buffers the data into lines (the sequence of characters ending with a carriage-return character) and processes erase characters internally before sending the received sequence to the reading program.

The full functions provided are:

(a) To parse input strings into lines;

(b) To process erase characters;

(c) To process a "kill" character that invalidates all characters typed so far on the current line;

(d) To echo (write) received characters to the terminal;

(e) To expand output such as tab characters to a sequence of blank spaces;

(f) To generate signals to programs for modem hangups, line breaks, or in response to a user hitting the delete key; and (g) To allow a raw mode that does not interpret special characters such as erase kill or carriage return for serial file transfers.

At step 79, note that a remote call procedure is implemented based on the fact that the normalized and grouped characters in the above-described steps 70-77, indicate a remote procedure call has occurred. At 79, an application has been allowed to specify the name of a procedure to be run on a slave CPU, pass the parameters to that procedure across the system bus 9 and receive the result of the remotely called procedure via a message. This RPC mechanism is asynchronous in that the application will not be idle during the execution of a remote procedure but can do some other, unrelated processing during that time, and be notified once the results of the remote call are available.

FIG. 6-10 illustrates the steps 70-79 of FIGS. 5a and 5b in more detail.

Figure 6:
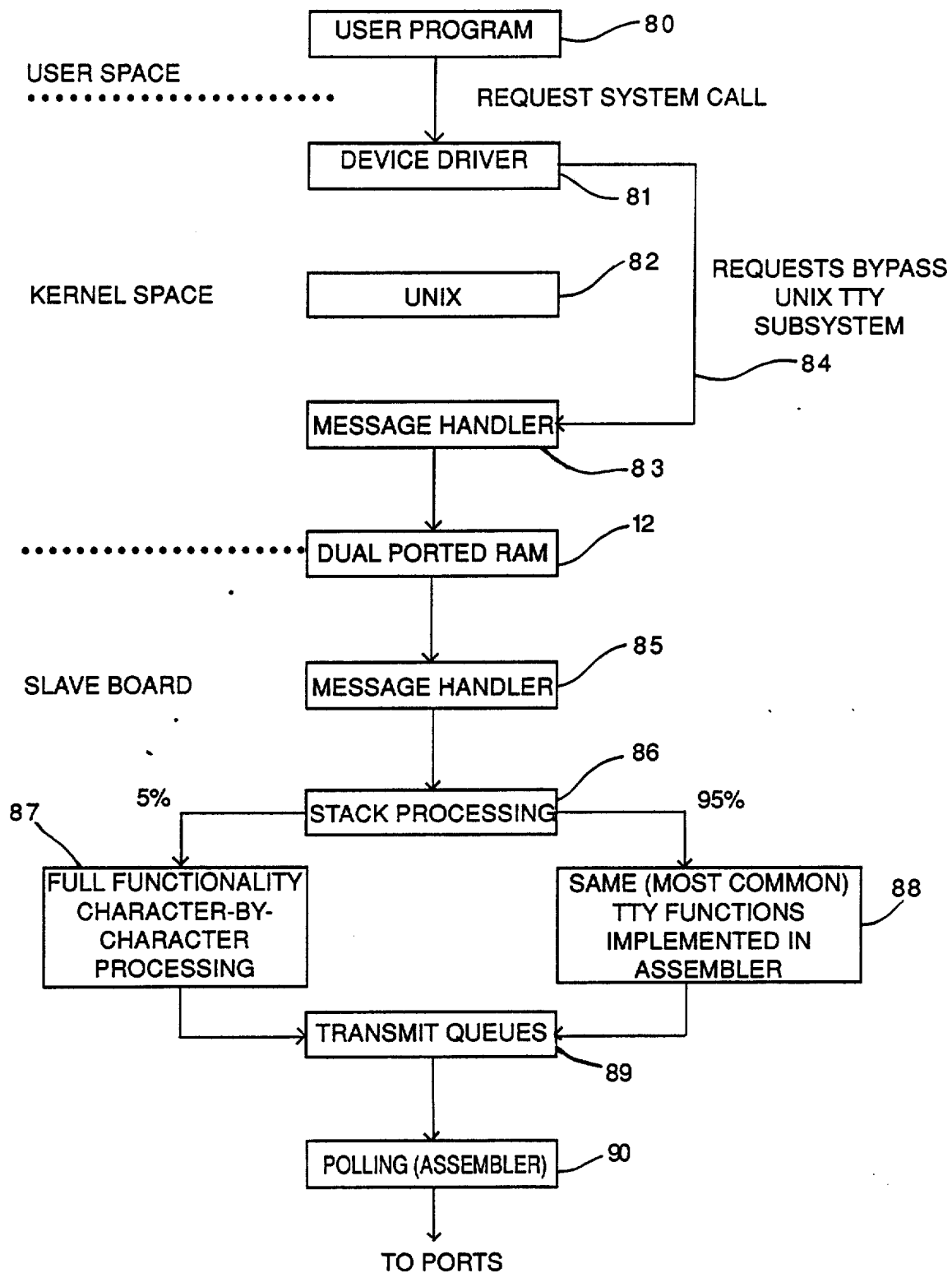

In FIG. 6, the request is first sent from the user's program at 80, through device driver submodule 81 bypassing the host UNIX ® based operating system terminal management at 82 and thence to message handling submodule 83 via bus 84. In the submodule 83, the request is encoded followed by a shallow decode at message handler submodule 85 adjacent to the dual ported RAM 12.

STANDARD UNIX ® LINE DISCIPLINE:

When a process writes to a terminal the internal line discipline also regenerated by a submodule in RAM 12 is invoked wherein it loops, reading output characters from user address space and placing them onto the output C-list, until it exhausts the data. The line discipline submodule output characters, expanding tab characters to a series of space characters, for example. If the number of characters on the output C-list becomes greater than a high-water mark, the line discipline submodule calls procedures to transmit the data on the output C-list to the terminal and puts the writing process to sleep. When the amount of data on the output C-list drops below a low-water mark, the interrupt handler submodule awakens all processes 5 asleep in the event the terminal can accept more data. The line discipline submodule finishes its loop, having copied all the output data from user space to the out C-lists, and calls a procedure to transmit the data to the terminal.

In the submodule 83, the request is first encoded followed by a shallow decode at duplicate message handler submodule 85 after passing into dual port at RAM 12. At 86 associated with indication of serial processing via clock interrupt, a decision is made whether to apply special or standard processing steps. Standard processing related to full functionality character by character processing occurs at 87. Special speedup processing takes place at 88 as previously mentioned. Queuing in a buffer and polling before the data is to be transmitted relative to the terminals, occur at 89 and 90.

Figure 7:
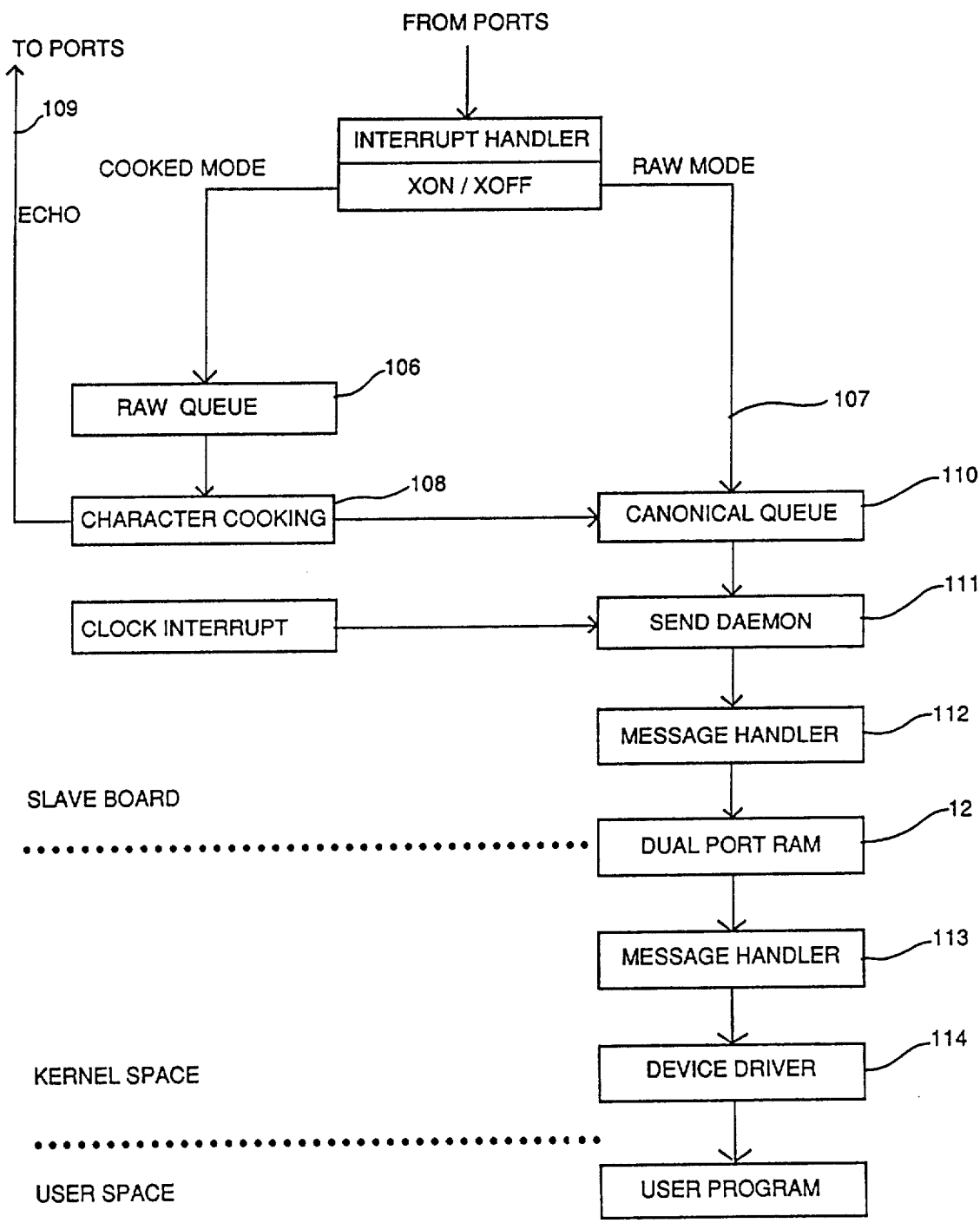

In FIG. 7 a hardware signal interrupt is first generated at interrupt handler submodule 105.

Control function is established when user 19 logs into the system. The terminal controls all processes.

Assume a process has been opened. Immediately the terminal driver enables the line discipline submodule in the I/O subsystem. If the process has process priority as the result of a prior system call and if the process does not have an associated control terminal, the line discipline submodule makes the opened terminal the control terminal.

The O/S at the host, stores major and minor device numbers and process group number and initiates logging in. Before discussion of the logging in procedure, a brief overview of the role of the control terminal is in order.

When a user presses the delete, break, rubout or quit keys, the interrupt handler submodule invokes the line discipline submodule, which sends the appropriate signal to all processes in the control process group. Similarly, if the user hangs up, the terminal interrupt handler submodule receives a hangup indication from the hardware, and the line discipline submodule sends a hangup signal to all processes in the process group. In this way, all processes initiated at a particular terminal receive the hangup signal; the default reaction of most processes is to exit on receipt of the signal; this is how stray processes are killed when a user suddenly shuts off a terminal. After sending the hang up signal, the terminal interrupt handler submodule disassociates the terminal from the process group so that processes in the process group can no longer receive signals originating at the terminal.

In FIG. 7, after the data is read and an acknowledgement generated, the data is processed in cooked or raw mode via steps 106, 107. For processing in a cooked mode 106, the data is enhanced at 108. A decision is made whether or not to generate an echo back via bus 109, or to pass the data to canonical queue 110.

For processing in the raw mode, the data is placed in a canonical queue 110, then sent to specified time intervals in step 111 to the host via handler submodule 112, the RAM 12, the message handler submodule 113 and device driver 114.

The read system call specifies the number of bytes the process wants to read, but the internal line discipline submodule satisfies the read on receipt of a carriage return even though the character count may not be satisfied. A process cannot predict how many characters the user will enter at the keyboard; hence it does not make sense to wait for the user to type a large number of characters. For example, users type command lines to the shell and expect the shell to respond to the command on receipt of a carriage return character. It makes no difference whether the commands are simple, such as "date" or "who," or whether they are more complicated command sequences. C The line discipline submodule knows nothing about shell syntax, and rightly so, because other programs that read terminals (such as editors) have different command syntax. Hence, the line discipline submodule satisfies read calls on receipt of a carriage return. 5 If no data is currently on either input C-list, the reading process sleeps until the arrival of a line of data. When data is entered, the terminal interrupt handler submodule 105 invokes the interrupt handler submodule which places the data on the raw C-list for input to reading processes and on the output C-list for C echoing back to the terminal. If the input string contains a carriage return, the interrupt handler submodule awakens all sleeping reader processes. When a reading process runs, characters are removed from the raw C-list, erase and kill characters processing, and the characters are placed on the canonical C-list. It then copies characters to user address space until the carriage return character or until it satisfies the count in the read system call, whichever number is smaller. However, a process may find that the data for which it awoke no longer exists. Other processes may read the terminal and remove the data from the raw C-list before the first process is rescheduled. Character processing in the input and output direction is asymmetric, evidenced by the two input C-lists and the one output C-list. The line discipline outputs data from user space, processes it, and places it on the output C-list. To be symmetric, there should be only one input call. However this would require the interrupt handler submodule to process erase and kill characters, making it more complex and time consuming, and blocking out other interrupts at a critical time. Use of two input C-lists means that the interrupt handler submodule can simply dump characters onto the raw C-list and wake up reading processes, which incur at the expense of processing input data. Nevertheless, the interrupt handler submodule puts input characters immediately on the output C-list, so that the user experiences minimal delay in seeing typed characters on the terminal.

CONTENDING FOR TERMINAL INPUT DATA:

Where a process creates many subprocesses that read their standard input file, there is contention for terminal data. Terminal input is usually too slow to satisfy all the reading processes, so the processes will spend most of their time sleeping in the terminal read algorithm, waiting for input data. When a user enters a line of data, the terminal interrupt handler submodule awakens all the reading process; since they slept at the same priority level, they are eligible to run at the same priority. The user cannot predict which process can read the line of data; the successful process prints the value of it the time it was spawned. All other processes will eventually be scheduled to run, but they will probably find no input data on the input C-lists and go back to sleep. The entire procedure is repeated for every input line; it is impossible to guarantee that one process does not hog all the input data.

It is inherently ambiguous to allow multiple readers of a terminal, but the kernel copes with situation as best as it can. On the other hand, the kernel must allow multiple processes to read a terminal, otherwise processes spawned by the shell that read standard input would never work, because the shell still accesses standard input, too. In short, processes must synchronize terminal access at user.

When the user types in "end of file" characters are controlled, the line discipline submodule satisfies terminal reads of the input string up to, but not including, the end of the character. It returns no data (return value 0) for the read system call that encounters only the end of file on the C-lists; the calling process is responsible for recognizing that it has read the end of file and that it should no longer read the terminal. Referring to the code examples for the shell the shell loop terminates when a user types control-d. The read call returns 0, and the shell exits.

Note that the case of dumb terminal hardware is considered when data is transmitted to the machine one character at a time, precisely as the user types it. Intelligent terminals cook their input in the peripheral, freeing the CPU for other work. The structure of their terminal drivers resembles that of dumb terminal drivers.

DEVICE DRIVER OPERATING IN RAW MODE:

Recall that the user set terminal parameters such as "erase" and "kill" characteristics and retrieve the values of current settings with a System call. Similarly the user can specify the terminal echoes its input, set the terminal baud rate (the rate of bit transfers), flush input and output character queues, or manually start up or stop character output. The data structure saves various control settings and the line discipline submodule receives the parameters of the ioctl call and sets or gets the relevant fields in the terminal data structure. When a process sets terminal parameters, it does so for all processes using the terminal. The terminal settings are not automatically reset when the process that changed the settings exits.

Process can also put the terminal into a raw mode, where the line discipline submodule transmits characters exactly as the user typed them. No input processing is done at all. Still, the kernel must know when to satisfy user rad calls, since the carriage return is treated as an ordinary input character. It satisfies read system calls after a minimum number of characters are entered at the terminal. The UNIX ® operating system arranges for the kernel to time the entry of characters from the terminal by placing entries into the callout table. Both criteria (minimum number of characters and fixed time) are set by an ioctl call. When the particular criterion is met, the line discipline interrupt handler submodule awakens all sleeping processes. The driver moves all characters from the raw C-list to the canonical list and satisfies the process call request, following the same algorithm as for the canonical case. Raw mode is particularly important for screen oriented applications, such as the screen editor vi, which has many commands that do not terminate with a carriage return. For example, the command dw deletes the word at the current cursor position.

The ioctl command TOGETA instructs the driver to retrieve the settings and save them in the structure savetty in the user's address space. This command is commonly used to determine if a file is a terminal or not, because it does not change anything in the system. If it fails, processes assume the file is not a terminal. Here, the process does a second ioctl call to put the terminal into raw mode. It turns off character echo and arranges to satisfy terminal reads when at least 5 characters are received from the terminal or when any number of characters are received and about 10 seconds elapse since the first was received. When it receives an interrupt signal, the process resets the original terminal options and terminates.

FLOODING BY MULTIPLE PROCESSES TO A TERMINAL:

Data written by the processes may be interleaved at the terminal, say because the process is writing the terminal using several write system calls. In this case the kernel could switch context while the process is in user mode between successive write system calls. Newly scheduled processes could then write the terminal while the original process sleeps.

Output data could also be garbled at a terminal because a writing process may sleep in the middle of a write system call while waiting for prior output data to drain from the system. The kernel could schedule other processes that write the terminal before the original process is rescheduled. Because of this case, the kernel does not guarantee that the contents of the data buffer to be output by a write system call appear continuously on the terminal and then goes into a loop, writing the string to its standard output file during each iteration. If the standard output is the terminal, the flow of data to the terminal is regulated. The output string is more than 64 characters long, too large to fit into a C-block (64 bytes long). Hence, more than one C-block for each write call is needed and output could become garbled.

INDIRECT MODE:

Processes frequently have a need to read or write data directly to the control terminal, even though the standard input and output may have been redirected to other files. For example, a shell script can send urgent messages directly to the terminal, although its standard output and standard error files may have been redirected elsewhere. UNIX ® systems provide "indirect" terminal access via the device file "/dev/tty", which designates the control terminal for every process that has one. Users logged onto separate terminals can access "/dev/tty", but they access different terminals.

There are two common implementations for the kernel to find the control terminal from the file name "/dev/tty". First, the kernel can define a special device number for the indirect terminal file with a special entry in the character device switch table. When invoking the indirect terminal, the driver for the indirect terminal gets the major and minor number of the control terminal from the u area and invokes the raw terminal driver through the character device switch table. The second implementation commonly used to find the control terminal from the name "/dev/tty" tests if the major number is that of the indirect terminal before calling the driver open routine. If so, it releases the inode for "/dev/tty", allocates the inode for the control terminal, resets the file table entry to point to the control terminal inode, and calls the open routine of the terminal driver. The file descriptor returned when opening C "/dev/tty" refers directly to the control terminal and its regular driver.

In the initialization, process 1, init, executes an infinite loop, reading the file "/etc/inittab" for instructions about what to do when entering system states such as "single user" or "multi-user." In multi-user state, a primary responsibility of init is to allow users to log onto terminals. It spawns processes called getty (for get terminal or get "tty") and keeps track of which getty process opens which terminal; each getty process resets its process group using the setpgrp system call, C opens a particular terminal line, and usually sleeps in the open until the machine senses a hardware connection for the terminal. When the open returns, getty accesses the logic program, which requires users to identify themselves by logic name and password. If the user logs in successfully, logic finally accesses the shell, and the user starts working. This invocation of the shell is called the logic shell. The shell process has the same process ID as the original getty process, and the logic shell is therefore a process group leader. If a user does not log on successfully, logic exits after a suitable time limit, closing the opened terminal line, spawns another getty for the line. Init pauses until it receives a death of child signal. On waking up, it finds out if the zombie process had been a logic shell and, if so, spawns another getty process to open the terminal in place of the one that died.

Figure 8:
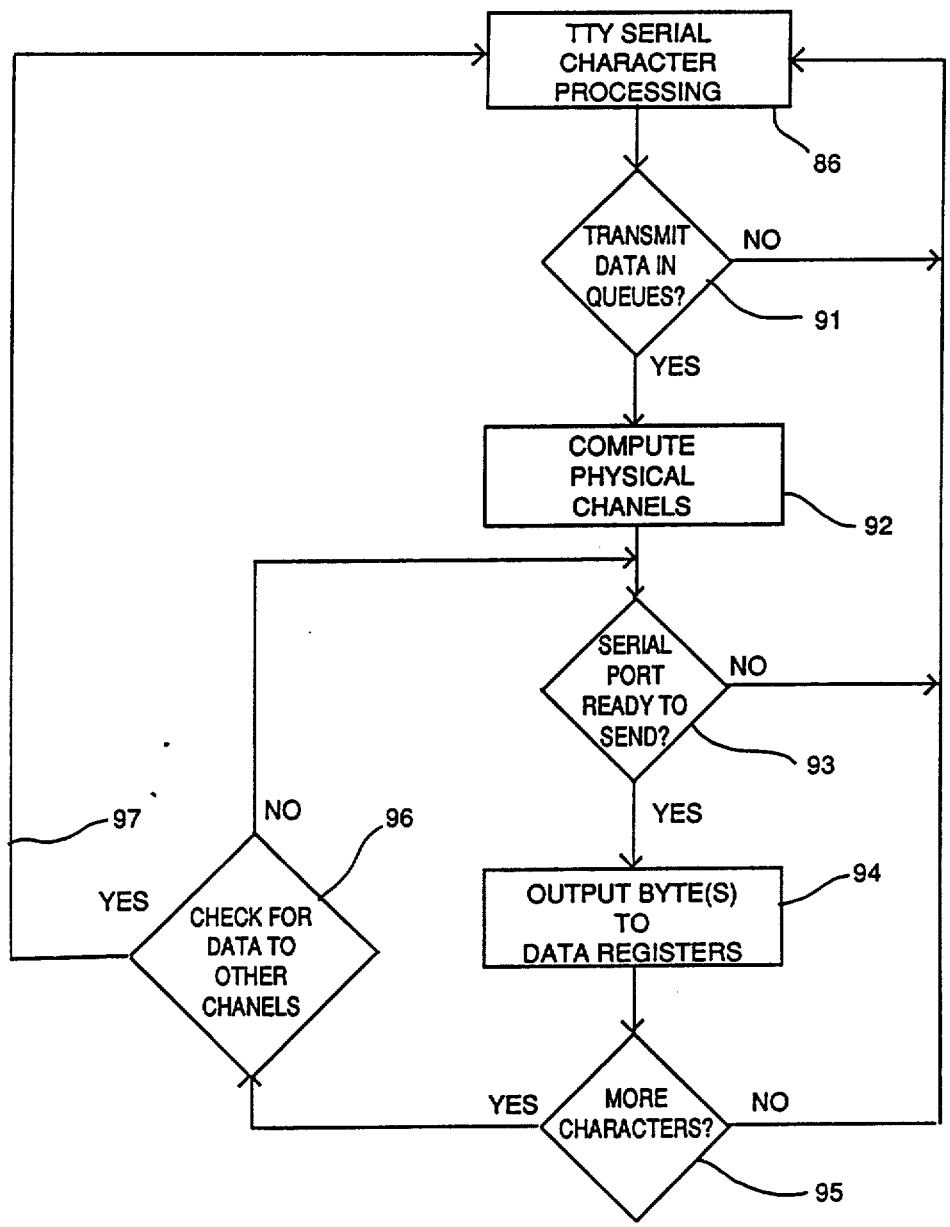

I/O SUBSYSTEM OUTPUT ROUTINES:

FIG. 8 shows steps 89, 90 of FIG. 6 in more detail.

After the data passes from step 86 via a clock interrupt, the date is check for queue order at 91 and passes to step 92 where a channel number is computed after the data is judged at 93 as satisfactory the data is loaded. The process iterates via affirmative answers at steps 95, 96 via loop 97.

Note that loop 97 is continuous. After initialization, queues for output data, are continuously checked. If found, the groups of data are moved from the queues to the serial ports each time the I/O subassembly receives a clock interrupt. Processing is only interrupted by a message from the host computer (message interrupt) a receive character interrupt or a clock schedule interrupt (send demon interrupt).

Figure 9:
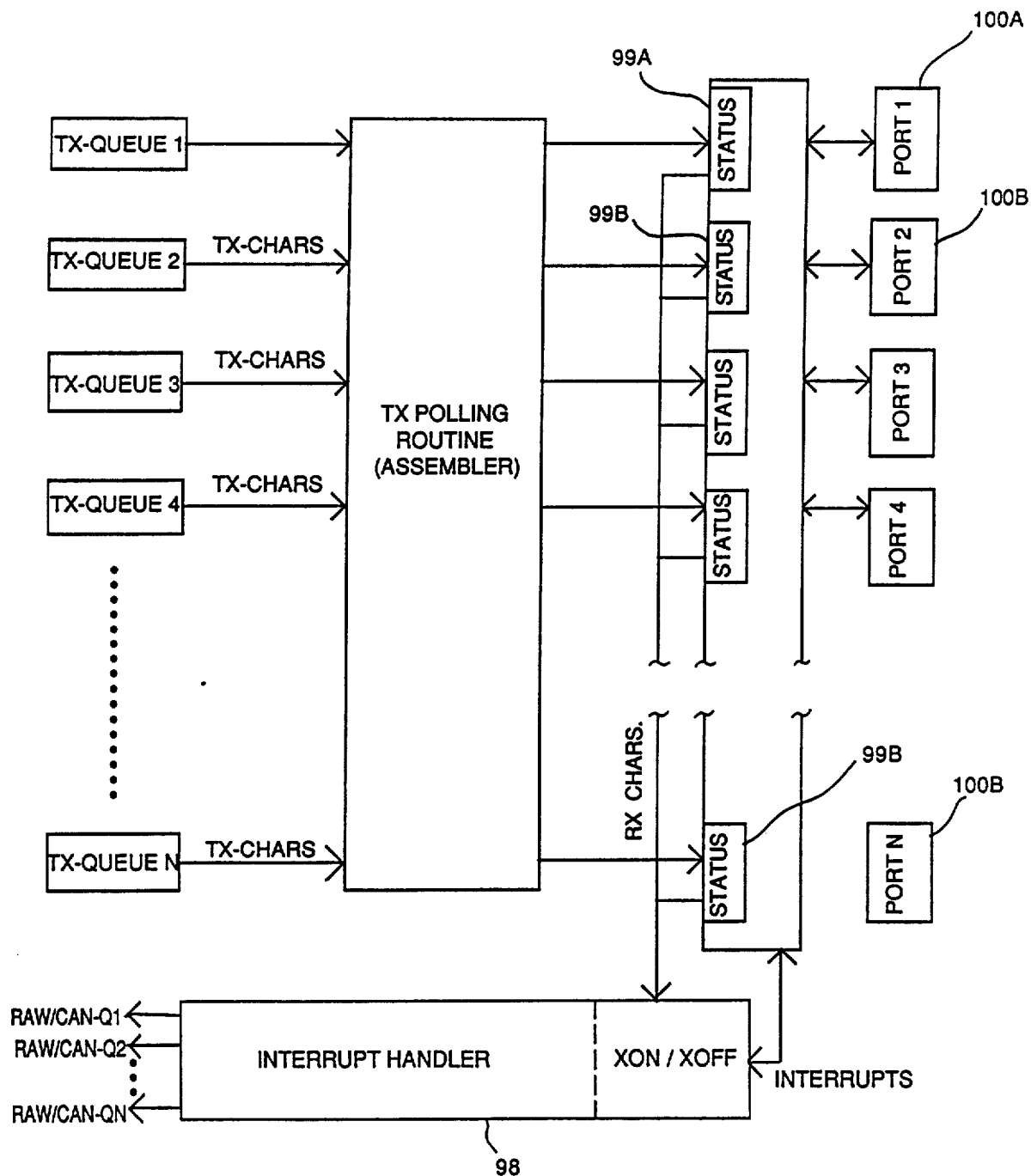

FIG. 9 shows further details of the polling in which the interrupt handler submodule 98 via X-ON, X-OFF handshake and status zones 99a and 99b control data flow to the ports 100a, 100b.

Figure 10:
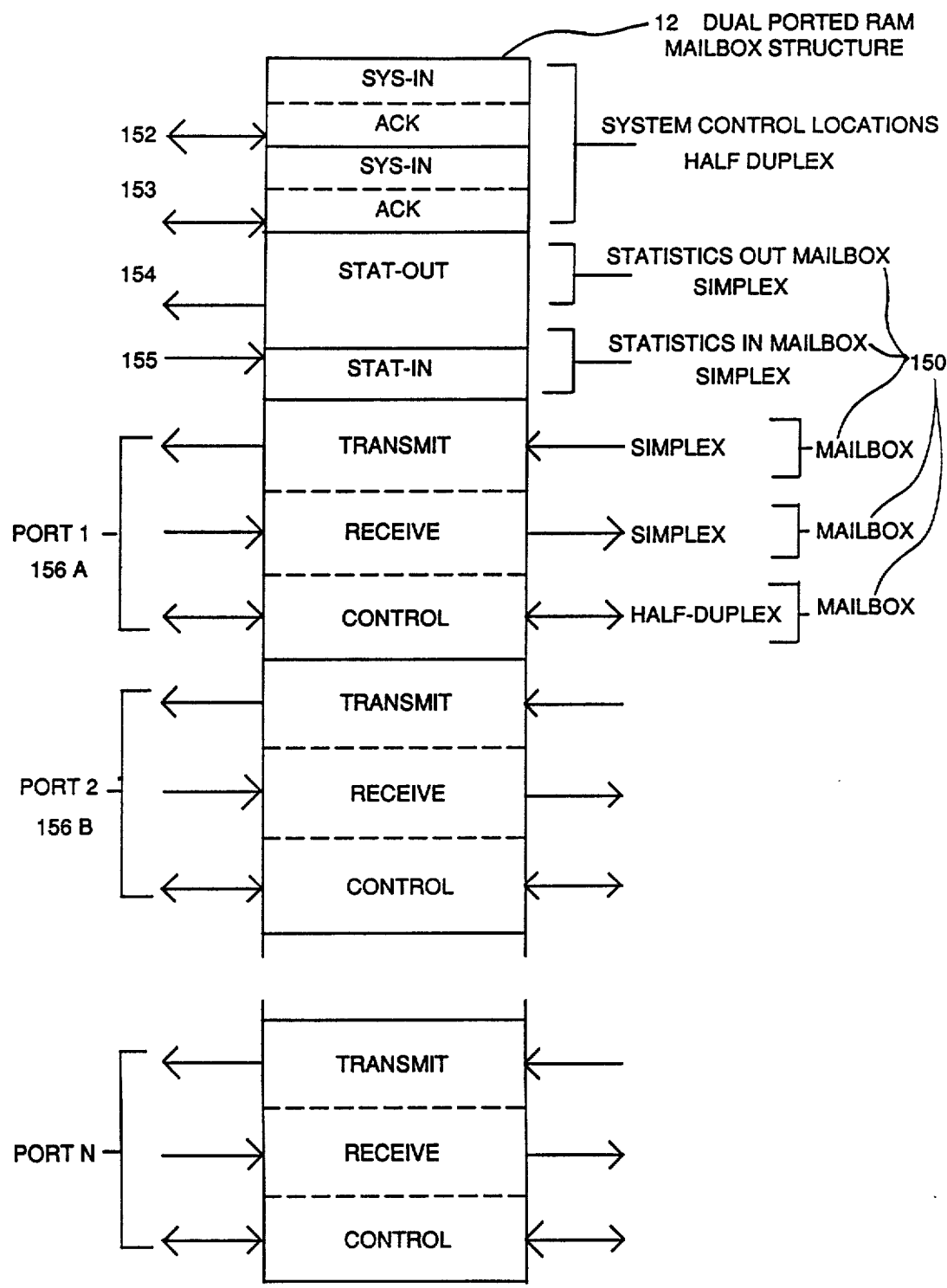

MESSAGE HANDLER MODULE:

FIG. 10 shows buffered submodule mailboxes 150 at dual port RAM 12.

A series of memory cells are sectioned to indicate that system control data stored at locations 152, 153 are highest priority. Since they are duplexed, they can be stored or written out at the same time. Statistics at cell locations 154, 155 are at a lower priority having to be stored or written out at different times (simplex mode), Cell locations 156a, 156b associated with ports 1 and 2, respectively, are also each prioritized having three subsections to transmit, to receive and control. Note that only the control data can be written out or stored at the same time and thus has high priority. The data cells have low priority.

Figure 11:
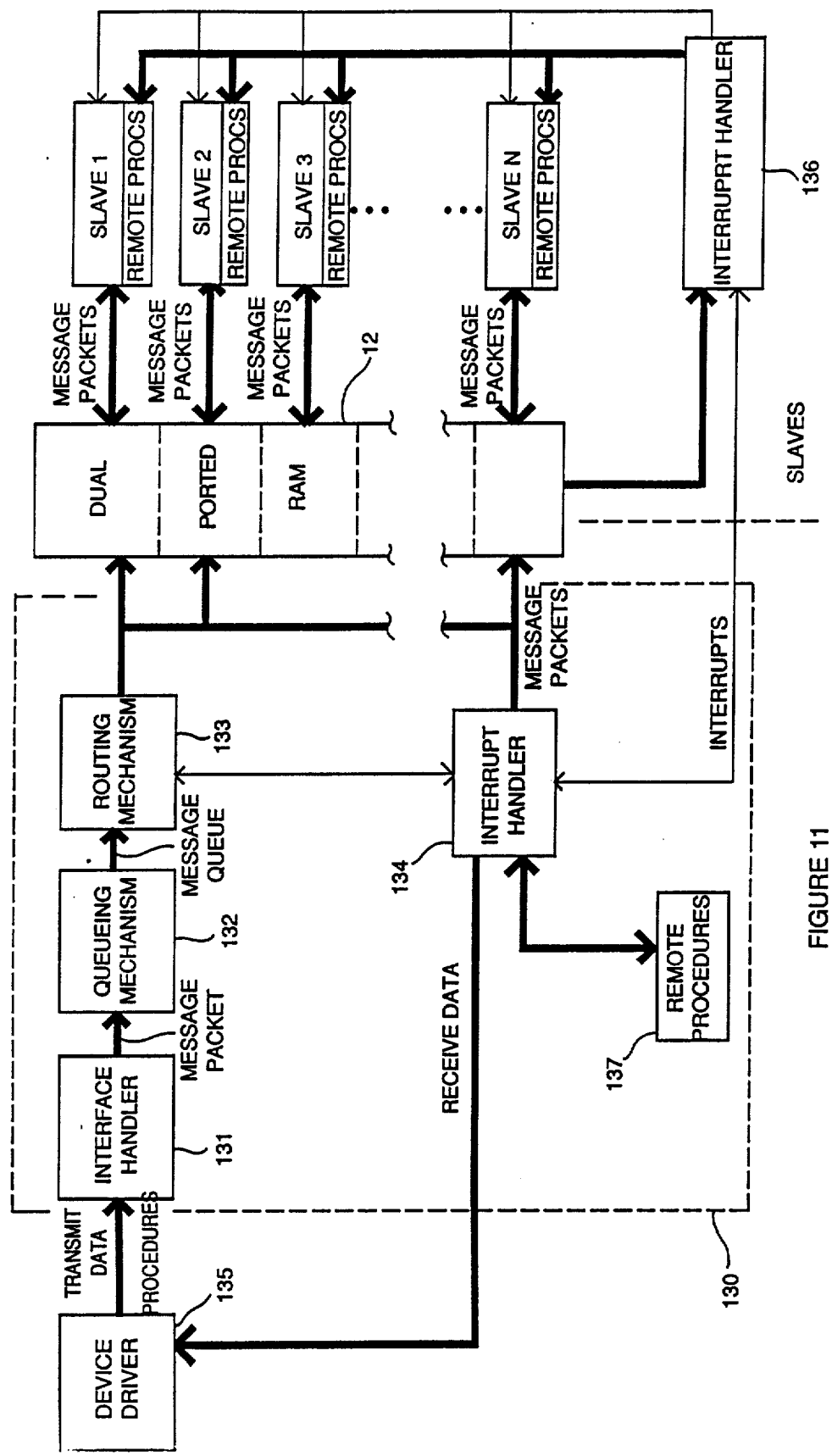

FIG. 11 illustrates the message handler command submodule 130 comprising an interface submodule 131, a queuing submodule 132, a routing submodule 133, and a low level interrupt submodule 134.

The message handler command submodule 130 provides all messages between the host and any number of I/O subassemblies. In addition, the message command submodule 130 implements a Remote Procedure Call ("RPC") which allows a user's application to specify the name of a particular procedure to be run on a CPU of a particular I/O subassembly, pass the parameters to that procedure across the system bus and receive the results via a message. This RPC mechanism is asynchronous, that is, an application need not be idle during the execution of a remote procedure but can do some other, unrelated processing during that time, and be notified once the results of the remote cell are available.

Now in more detail the message handler submodule 130, consists of four different parts (1) the interface submodule 131 which presents a clean interface to the application by offering a small number of high level functions;

(2) the queuing submodule 132 which takes care of the buffering and sequencing of messages;

(3) the routing submodule 133 which ensures that messages are sent to the right destination (inbound and outbound), and;

(4) the low level interrupt handler submodule 134 which implements a communications protocol and a remote procedure call mechanism.

The interface submodule 131 allows an application to easily request a low level operation without having to be concerned with the intricacies of the message passing protocol, the interrupt conventions, physical I/O subassembly addresses, and so on. For example, an application may request that the baud rate of a port should be changed by simply specifying the I/O subassembly number J, port and baud rate.

The queuing submodule 132 accepts messages and schedules them for transmission. In that way it is possible for an application to issue requests and to send messages without regard for the exact real time communication constraints. The queuing mechanism also acts as a buffer for messages.

The routing submodule 133 examines the destination of messages and ensures that messages are passed to the correct destination by placing them into the appropriate input or output queue. It also reschedules lost or corrupted messages for C retransmissions.

The low level interrupt handler submodule 134 is responsible for the low level communication in the I/O subassemblies. It handles the copying of messages into and out of shared memory 12 as well as the low level communications protocol, such as the setting and clearing of message addresses and the acknowledgement of messages.

On transmission, device driver 135 issues a high level request, giving the required logical information, such as baud rate or the number of bytes to be transmitted and their location. This request is processed by the interface submodule 113, which assembles the request into a message packet and passes it on to the queuing submodule 132. The message is placed on queue and held there for transmission. The routing submodule 133 is informed by the interrupt handler submodule 134 when the dual port RAM 12 is available for writing, extracts the destination from the message packet, copies the message into dual port RAM 12 and sends an interrupt to the appropriate slave board via interrupt handler submodule 136. The slave board, when the message arrives, is notified via the interrupt just sent by the host, and uses its private copy of the message handler submodule 134, (which is an exact duplicate of the message handler submodule on the host side) to process the message.

On receipt of a message, the interrupt handler submodule 134 informs the routing mechanism submodule 133 if the message indicates an acknowledgement for a previously sent message, so that the routing submodule 135 mechanism 133 can dequeue that message. If the message type indicates a remote procedure cell, the interrupt handler submodule 134 invokes the appropriate procedure at submodule 137 if the message type indicates that the message contains data from a port, the interrupt handler submodule 134 wakes up the device driver 135 which then copies the data into user data space.

REMOTE EXECUTION OF TERMINAL MANAGEMENT:

Unlike conventional UNIX ® management programs, the I/O management program of the present in residence in each I/O subassembly in RAM 12 and establishes a unique priority hierarchy, viz., input keystroke signals ("characters") receive highest priority. As a result, even at rates of 38.4 kbits/sec the I/O subassembly can process the increasing keystroke characters. As a result of total off-loading of such characters, host CPU overhead is reduced by a factor of 50 of that of conventional controllers.

While it is believed that the program listing in connection with the instant application is not needed since the nature of the input and output data and the control functions are set forth in detail, nevertheless, a copy of the program listing is made a part of the intrant application and incorporated herein by reference.

TERMINAL OUTPUT MODES CHECKED BY I/O SUBSYSTEM

Special field code specifies output:

| | | |
|---|---|---|
| OPOST | 0000001 | Postprocess output. |
| OLCUC | 0000002 | Map lowercase to upper on output. |
| ONLCR | 0000004 | Map NL to CR NL on output. |
| OCRNL | 0000010 | Map CR to NL on output. |
| ONOCR | 0000020 | No CR output at column O. |
| ONLRET | 0000040 | NL performs CR function. |
| OFILL | 0000100 | Use fill characters for delay. |
| OFDEL | 0000200 | Fill is DEL, else NUL. |
| NLDLY | 0000400 | Select new-line delays: |
| NL0 | 0 | |
| NL1 | 0000400 | |
| CRDLY | 0003000 | Select carriage-return delays: |
| CR0 | 0 | |
| CR1 | 0001000 | |
| CR2 | 0002000 | |
| CR3 | 0003000 | |
| TABDLY | 0014000 | Select horizontal-tab delays: |
| TAB0 | 0 | |
| TAB1 | 0004000 | |
| TAB2 | 0010000 | |
| TAB3 | 0014000 | Expand tabs to spaces. |
| BSDLY | 0020000 | Select backspace delays: |
| BS0 | 0 | |
| BS1 | 0020000 | |
| VTDLY | 0040000 | Select vertical-tab delays: |
| VT0 | 0 | |
| VT1 | 0040000 | |
| FFDLY | 0100000 | Select form-feed delays: |
| FF0 | 0 | |
| FF1 | 0100000 | |

If OPOST is set, output characters are post-processed as indicated by the remaining flags, otherwise characters are transmitted without change. If OLCUC is set, a lowercase alphabetic character is transmitted as the corresponding uppercase character. This function is often used in conjunction with IUCLC. If ONLCR is set, the NI character is transmitted as the CR NL character pair. If OCRNI is set, the CR character is transmitted as the NL character. If ONOCR is set, no CR character is transmitted when at column 0 (first position). If ONLRET is set, the NL character is assumed to do the carriagereturn function; the column pointer will be set to 0 and the delays specified for CR will be used. Otherwise the NL character is assumed to do just the line-feed function; the column pointer will remain unchanged. The column pointer is also set to 0 if the CR character is actually transmitted. The delay bits specify how long transmission stops to allow for mechanical or other movement when certain characters are sent to the terminal. In all cases a value of 0 indicates no delay. If OFILL is set, fill characters will be transmitted for delay instead of a timed delay. This is useful for high baud rate terminals which need only a minimal delay. If OFDEL is set, the fill character is DEL, otherwise NUL.

If form-feed or vertical-tab delay is specified, it lasts for about 2 seconds.

New-line delay lasts about 0.10 seconds. If ONLRET is set, the carriage-return delays are used instead of the new-line C delays. If OFILL is set, two fill characters will be transmitted.

Carriage-return delay type 1 is dependent on the current column position, type 2 is about 0—10 seconds, and type 3 is about 0.15 seconds. If OFILL is set, delay type 1 transmits two fill characters, and type 2, four fill characters.

Horizontal-tab delay type 1 is dependent on the current column position. Type 2 is about 0.10 seconds. Type 3 specifies that tabs are to be expanded into spaces. If OFILL is set, two fill characters will be transmitted for any delay.

Backspace delay lasts about 0.05 seconds. If OFILL is set, one fill character will be transmitted.

The actual delays depend on line speed and system load.

The initial output control value is all bits clear.

HARDWARE PORT CONTROL:

Another special field code describes the hardware control of the terminal:

| CBAUD | 0000017 | Baud rate: |
|---|---|---|
| B0 | 0 | Hang up |
| B50 | 0000001 | 50 baud |
| B75 | 0000002 | 75 baud |
| B110 | 0000003 | 110 baud |
| B134 | 0000004 | 134.5 baud |
| B150 | 0000005 | 150 baud |
| B200 | 0000006 | 200 baud |
| B300 | 0000007 | 300 baud |
| B600 | 0000010 | 600 baud |
| B1200 | 0000011 | 1200 baud |
| B1800 | 0000012 | 1800 baud |
| B2400 | 0000013 | 2400 baud |
| B4800 | 0000014 | 4800 baud |
| B9600 | 0000015 | 9600 baud |
| EXTA | 0000016 | External A |
| EXTB | 0000017 | External B |
| CSIZE | 0000060 | Character size: |
| CS5 | 0 | 5 bits |
| CS6 | 0000020 | 6 bits |
| CS7 | 0000040 | 7 bits |

-continued

| CS8 | 0000060 | 8 bits |
|---|---|---|
| CSTOPB | 0000100 | Send two stop bits, else one. |
| CREAD | 0000200 | Enable receiver. |
| PARENB | 0000400 | Parity enable. |
| PARODD | 0001000 | Odd parity, else even. |
| HUPCL | 0002000 | Hang up on last close. |
| CLOCAL | 0004000 | Local line, else dial-up. |
| LOBLK | 0010000 | Block layer output. |

The CBAUD bits specify the baud rate. The zero baud rate, B0, is used to hang up the connection. If B0 g is specified, the data-terminal ready signal will not be asserted. Normally, this will disconnect the line. For any particular hardware, impossible speed changes are ignored.

The CSIZE bits specify the character size in bits for both transmission and reception. This size does not include the parity bit, if any. If CSTOPB is set, two stop bits are used, otherwise one stop bit. For example, at 110 baud, two stops bits are required.

If PARENB is set, parity generation and detection is enabled and a parity bit is added to each character. If parity is enabled, the PARODD flag specifies odd parity if set, otherwise even parity is used.

If CREAD is set, the receiver is enabled. Otherwise no characters will be received.

If HUPCL is set, the line will be disconnected when the last process with the line open closes it or terminates. That is, the data-terminal-ready signal will not be asserted.

If CLOCAL is set, the line is assumed to be a local, direct connection with no modem control. Otherwise modem control is If LOBLK is set, the output of a job control layer will be blocked when it is not the current layer. Otherwise the output generated by that layer will be multiplexed onto the current layer. (Not on PDP-11)

The initial hardware control value after open is B300, CS8, CREAD, HUPCL.

LINE DISCIPLINE SUBMODULE: Another field code of the argument structure is used by the line discipline submodule to control terminal functions. The basic line discipline (0) provides the following:

| ISIG | 0000001 | Enable signals. |
|---|---|---|
| ICANON | 0000002 | Canonical input (erase and kill processing). |
| XCASE | 0000004 | Canonical upper/lower presentation. |
| ECHO | 0000010 | Enable echo. |
| ECHOE | 0000020 | Echo erase character as BS SP BS. |
| ECHOK | 0000040 | Echo NL after kill character. |
| ECHONL | 0000100 | Echo NL. |
| NOFLSH | 0000200 | Disable flush after interrupt or quit. |

If ISIG is set, each input character is checked against the special control characters INTER, SWITCH, and QUIT. If an input character matches one of these control characters, the function associated with that character is performed. If ISIG is not set, no checking is done. Thus, these special input functions are possible only if ISIG is set. These functions may be disabled individually by changing the value of the control character to an unlikely or impossible value (e.g., 0377).

If ICANON is set, canonical processing is enabled. This enables the erase and kill edit functions, and the assembly of input characters into lines delimited by NL, EOF, and EOL. If ICANON is not set, read requests are satisfied directly from the input queue. A read will not be satisfied until at least MIN characters have been received or the timeout value TIME has expired between characters. This allows fast bursts of input to be read efficiently while still allowing single character input. The MIN and TIME values are stored in the position for the EOF C and EOL characters, respectively. The time value represents tenths of seconds.

If XCASE is set, and if ICANON is set, an uppercase letter is accepted on input by preceding it with a character, and is output preceded by a character. In this mode, escape sequences are generated on output and accepted on input:

For example, A is input as a, a ss n, and N ss n.

If ECHO is set, characters are echoed as received.

When ICANON is set, the following echo functions are possible. If ECHO and ECHOE are set, the erase character is echoed as ASCII BS SP BS, which will clear the last character from a CRT screen. If ECHOE is set and ECHO is not set, the erase character is echoed as ASCU SP BS. If ECHOK is set, the NL character will be echoed after the kill character to emphasize that the line will be deleted. Note that an escape character preceding the erase or kill character will be echoed even if ECHO is not set. This is useful for terminals set to local echo (socalled half duplex). Unless escaped, the EOF character is not echoed. Because EOT is the default EOF character, this prevents terminals that respond to EOT as the default EOF character from hanging up.

If NOFLSH is set, the normal flush of the input and output queues associated with the quit, switch, and interrupt characters will not be done.

The initial line-discipline control value is all bits clear.

PRIMARY SYSTEM CALLS:

The primary system calls have the form:
ioctl (fildes, command, arg)
struct termio *arg;

The commands using this form are:

TCGETA Get the parameters associated with the terminal and store in the termio structure referenced by arg.

TCSETA Set the parameters associated with the terminal from the structure referenced by arg. The change is immediate.

TCSETAW Wait for the output to drain before setting the new parameters. This form should be used when changing parameters &:hat will affect output.

TCSETAF Wait for the output to drain, then flush the input queue and set the new parameters.

Additional ioctl (2) calls have the form:
ioctl (fildes, command, arg)
int arg;

The commands using this form are:

TCSBRK Wait for the output to drain. If arg is 0, then send a bread (zero bits for 0.25 seconds).

TCXONC Start/stop control. If arg is 0, suspend output; if 1, restart suspended output.

TCFLSH If arg is 0, slush the input queue; if 1, flush the output queue; if 2, flush both the input and output queues.

FILES
dev/tty* tty names for STALLION.

SEE ALSO
stty(1), fork(2), setpgrp(2), signal(2).

NAME
tty-controlling terminal interface

DESCRIPTION

The file /dev/tty is, in each process, a synonym for the control terminal associated with the process group of that process, if any. It is useful for programs or shell sequences that wish to be sure of writing messages on the terminal no matter how output has been redirected. It can also be used for programs that demand the name of a file for output, when typed output is desired and it is tiresome to find out what terminal is currently in use.

FILES
/dev/tty
/dev/tty*

I/O SUBSYSTEM SOFTWARE INSTALLATION:

The install script on the device driver diskette will extract all the files from the diskette and store them in the appropriate directories on the hard disk. These files include configuration data, command procedure, message handlers, a (software down-loader and the I/O subsystem ("slave") code.)

The user will be prompted for the number of I/O subassemblies. The entries are added to the master and xenixconf files and the terminal and modem special files are created. The file /etc/rc is modified to add a call to the I/O subassembly down lcad program "sioput" when the system boots. This call down-loads the code to the external RAM of each I/O subassembly. Next the terminal definitions are added.

It is necessary for the user to select which of the baud rate tables will be used. These tables share all common data rates but differ slightly to cater for special devices that require unusual baud rates. I/O subassembly menu allows you to set the memory address, I/O address and interrupt level. If these values need to be changed from the factory default positions, the settings for dip switches 1 (SW1) and (SW2) and the interrupt jumper (J2, J3) need to be altered. The installation program determines the dip switch settings from the new memory and I/O addresses input by the user. If the default parameters are chosen and only one slave board is installed, there should be no need to change the dip switch settings from the factory defaults.

| Default settings Board 0 (factory default) | |
|---|---|
| Memory Address | EC0000 |
| SW1 = ON ON OFF OFF ON OFF OFF OFF | |
| I/O Address | 330 |
| SW2 = ON OFF OFF ON ON OFF OFF ON | |
| Interrupt | IRQ 15 |
| J3 = POS1 | |

Definition for the Serial I/O Ports

Terminal ports are named: /dev/ttynxx
Where nxx is a three digit string
representing [n = board number] and [xx = port number]
eg 012 is port 12 on board 0.
Board 0 uses tty000–tty015
(ports 0–15 on 2nd I/O Panel)
Board 2 uses tty200–tty215
(ports 0–15 on 3rd I/O Panel)
Board 3 uses tty300–tty315
(ports 0–15 on 4th I/O Panel)
Modem ports follow a similar convention /dev/ttyNxx.
(where N = board number + 4).
The modem ports use the following device names:

-continued

```
Board 0 uses tty400-ty415
 (ports 0-15 on 1st I.O Panel)
Board 1 uses tty500-tty515
 (ports 0-15 on 2nd I/O Panel)
Board 2 uses tty600-tty615
 (ports 0-15 on 3rd I/O panel)
Board 3 uses tty700-tty715
 (ports 0-15 on 4th I/O Panel)
```

I/O SUBSYSTEM PROCESSING:

To accommodate interactive use, device drivers at the host connect to an internal line discipline submodule that is a enhanced duplicate of UNIX ® ® terminal management subsystem in the host. The submodule interprets input and output data and acts upon the data depending on condition preferences. In a canonical reference condition, such submodule converts (substitutes) data entries of user to a proper canonical form before sending the data on to the host and vice versa.

In a raw reference condition, stash submodule passes the data without change.

The canonical reference condition accommodates entry errors. Users at the terminals can be error-prone typists.

Terminals provide an "erase" key (or such a key can be so designated) such that the user can logically erase part of the typed sequence and enter corrections. The terminal sends the entire sequence including the erase characters. In canonical mode, the line discipline submodule buffers the data into lines (the sequence of characters until a carriage-return character) and processes erase characters internally before sending the revised sequence to the submodule host.

The functions of line discipline submodule are:

To parse input strings into lines;

To process erase characters;

To process a "kill" character that invalidates all characters typed so far on the current line;

To echo (write) received characters back to the terminal;

To expand output such as tab characters to a sequence of blank spaces;

To generate signals to processes for terminal hang-ups, line breaks, or in response to a user hitting the delete key;

To allow a raw mode that does not interpret special characters such as erase, kill or carriage return.

The XENIX/UNIX ® ® terminal management module of the present invention allows buffering within the dual port RAM 12 (FIG), whereby user data packets are coalesced into larger packets. The scheme greatly reduces the number of messages passed between CPU's without incurring the overhead normally associated with an extra level of buffering.

The program algorithm at each I/O subassembly is down loaded at host boot, rather than being fixed in ROM. Software updates and enhancements are thus easily incorporated.

Once down loaded the program performs all the functions of the traditional UNIX ®/XENIX tty subsystem. Local echo, X-ON/X-OFF and all input and output per character processing is performed as discussed above.

Full support of "raw" and "cooked" mode input is provided. Timeouts and minimum packet length can be specified with raw mode and a variety of line terminators can be specified in cooked mode. Special characters are processed, notably: erase, kill switch and interrupt.

Comprehensive statistics and profiling counters are accumulated. The program "siomon" allows full user access to this information to aid in system tuning and performance enhancement.

HARDWARE INSTALLATION:

Installation of the I/O subassembly of the present invention in a PC host is set forth in detail in the manual "STALLION Intelligent Serial I/O Controller for IBM PC/AT and 386 and Compatible Systems IBM RT/PC", (Dec. 1987) incorporated herein by reference.

INTERNAL I/O SUBSYSTEM INTERRUPTS:

External maskable interrupts are handled by the CPU's of each I/O subassembly of the invention as well as by the CPU of There are 12 possible sources of external interrupts per each I/O subassembly. One of the 801 86 interrupts is assigned to the incoming host message interrupt. The other two are used as set forth below:

IRQ0 - Interrupt in from PC/AT
IRQI - INT from external 8-2-59A PIC
IRQ2 - Spare
IRQ3 - Interrupt acknowledge to PIC (INTA)
NMI Non Maskable Interrupt invokes debug monitor All the internal sources of interrupts such as timers and DMA termination are available.

An Intel 8259A Programmable Interrupt Controller is used to priorities eight interrupts generated by the asynchronous C communication devices. All I/O devices are at even addresses. A device with a base address of PORT has the next register at address PORT+2.

8259A Interrupts
IR0 DUART0
IR1 DUART1
IR2 DUART2
IR3 DUART3
IR4 DUART4
IR5 DUART5
IR6 DUART6
IR7 DUART7

HOST INTERRUPT LEVEL: The I/O subassembly can interrupt the host by asserting one of the interrupt lines on the I/O channel. Unlike most systems the interrupt generated is a pulse and not a level. The selected interrupt line is always high. An interrupt is sent, this line goes low for 500 ns and then returns high. The Programmable Interrupt Controller (PIC) on the host must be programmed for edge triggered mode. The PIC will detect the edge and keep the interrupt latched until serviced. Jumpers J2 and J3 allow the interrupt level to be set (default is IRQ 15). As this interrupt is tristate when it is inactive it cannot conflict with other devices.

DUAL PORT RAM BUFFER:

All data and inter CPU messages are transferred through a 64 KB dual port RAM buffer. This buffer appears as normal 16 bit memory to the host I/O channel. The start address of the buffer is dip switch selectable on 128 KB boundaries in the 16 MB memory address space. This is necessary as the host can only decode a minimum of 128 KB for a 16 bit memory device on the I/O channel. The default address for board 0 is EC0000-EDFFFF. Dip switch 1 (SW1) selects the base address and the default configuration is ON ON OFF OFF ON OFF OFF OFF. The switch is a reversed representation of the top seven bits of the 24 bit address (A17=POS2 A23 POS8, POS1 should always be ON). Switch setting examples are included in Section 5.

I/O ADDRESS:

To enable the host and each I/O subassembly to signal the beginning and end of commands, a simple interrupt mechanism has been employed. The host writes to an I/O port on the I/O subsystem which interrupts the onboard 80186 CPU. The I/O address of this port is selectable anywhere in the I/O map. The default address is 330–337. Dip switch 2 (SW2) selects the base address and the default configuration is ON OFF OFF ON ON OFF OFF ON (A3=POS1 A9=POS8 should always by ON). ON represents a "0" and OFF represents a "1".

EXAMPLES:

The present invention has been incorporated in association with various UNIX ® and XENIX base application programs run by a PC having multiple users. The description of such users are briefly set forth below by identifying the nature of the tasks.

TASKS PERFORMED: C (1) Matrix and channel switch control including network monitoring, alarm indication and network reconfigurating;

(2) Manage point-of-sale accounts and inventory of goods in multi user environments;

(3) Manage modem driven data base and word processing of linked research laboratories;

(4) Manage a file system.

Manage point-of-use accounts in multi-user medical system;

(2) Manage manufacture process with multi-users where spooling, multi and single task application were used;

(3) Controlling a process line with multiple process inputs (e.g., weights, label printers, grading probes, bar code scanners, printers), controlling multiple inventory and multiordering entry agreements.

COMPARISONS:

The present invention has been compared with various other I/O subsystems in association with a host using a XENIX ® O/S.

Benchmarks have been performed using a public domain terminal benchmark package. The package is freely available and uses simple shell scripts and a few C programs for measurement. Full README documentation accompanies the benchmarks.

The testing of total throughput for input and output is relatively simple. However, determining the exact CPU consumption when performing an I/O task is more difficult. The standard XENIX ® "time" command reports real (elapsed time), user time (time spent in the application program), and system time (time spent in the operating system and device drivers). The "time" command cannot measure time spent in a device driver with system hardware interrupts disabled. Consequently, a driver which simply disables interrupts completely will appear to consume little or no time. This is precisely what the standard XENIX comms driver does when performing raw output.

A real program called "total" is supplied, which after being calibrated, measures exactly how much CPU is consumed by given activities. Unfortunately, the tests in their current form cannot account for subsystems which cause the system clock to lose time. Results will thus appear better than true.

The benchmarks were performed on an IBM 6 MHz AT using XENIX 286 2.2. (Unfortunately 386 drivers were unavailable for most cards at the time of the test.)

All tests were performed at 9600 baud. Both raw output (where XENIX performs no data translation) and cooked output tests were performed. Cooked mode entails the conversion of <CARRIAGE RETURN> to <LINE FEED> on input and <LINE FEE> to <CARRIAGE RETURN> <LINE FEED> on output. No expansion of tabs was performed.

Only output tests are presented as the majority of the cards simply failed to complete the input tests making comparison meaningless. Some results are suppressed as the loss of time from the system clock was such as to invalidate results.

Figure 12:
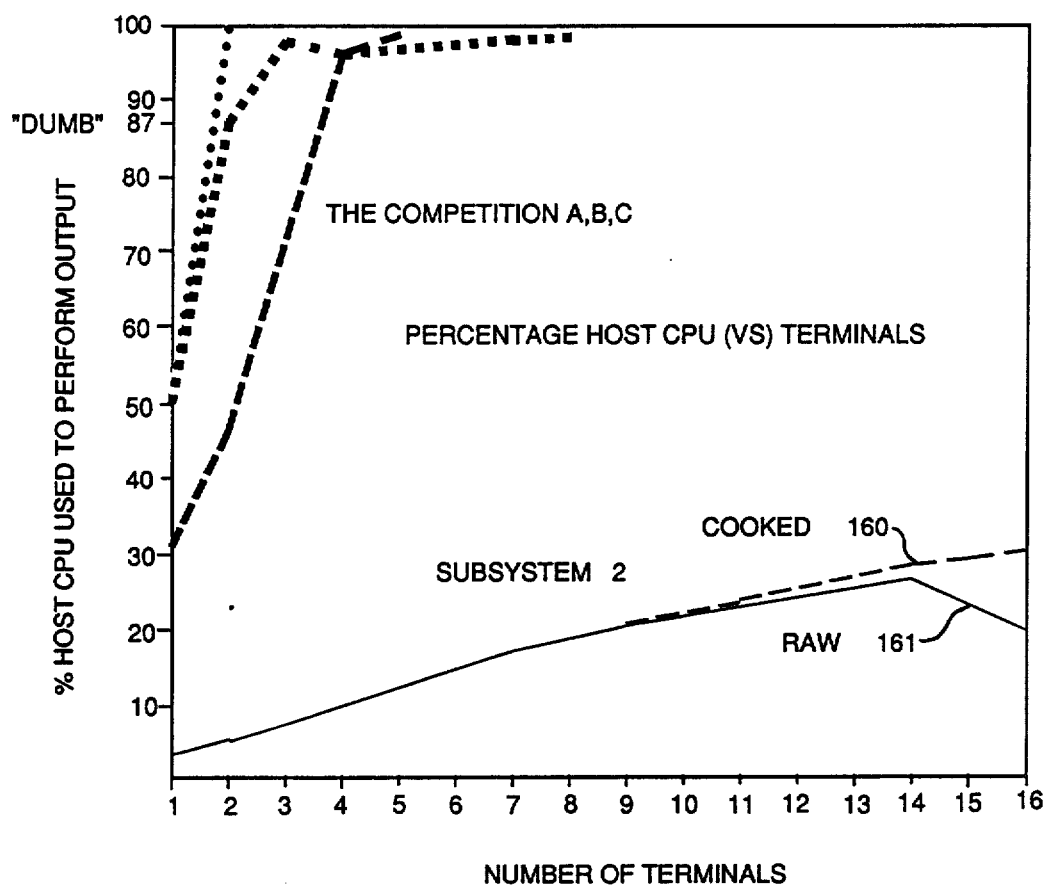
FIGS. 12–14 are performance graphs of the invention.

As shown in FIG. 12, the subsystem of the invention provides a boost over the competitors A-D in a basis of I/O overhead. The slowest rate of assent by curves 160, 161 is most desirable as shown. A "dumb" serial port consumes 87% of the main CPU time when outputting at a normalized rate of 9600 Bits/sec. Most "intelligent" boards consume 100% of the main CPU and can offer no more throughput when 4 ports are active. Morever, above 6 terminals the throughput of all of such boards is constant since 100% of the host CPU resources are being consummed. The subsystem of the invention consumes less than 3% of the main CPU for one port and a low 30% for 16 ports on a 6 MHz PC/AT. When installed in 32 bit systems, the I/O overhead is reduced to 1% for one port and 8% for 16 ports, i.e., even with 16 terminals the invention does not recognize the host system instantly.

In addition, completely eliminating the terminal I/O overhead component dealing with serial character processing and providing good I/O throughput even through the number of terminals may increase, improves multiuser performance by orders of magnitude. In character processing, the I/O subassembly of the invention tests and processes each serial character and checks all possible output modes, all completely independent of the host. Such component remains eliminated even though the terminals number beyond 6, up to say 32 for a 16-bit word system and 64 for a 32-bit word system.

Figure 13:
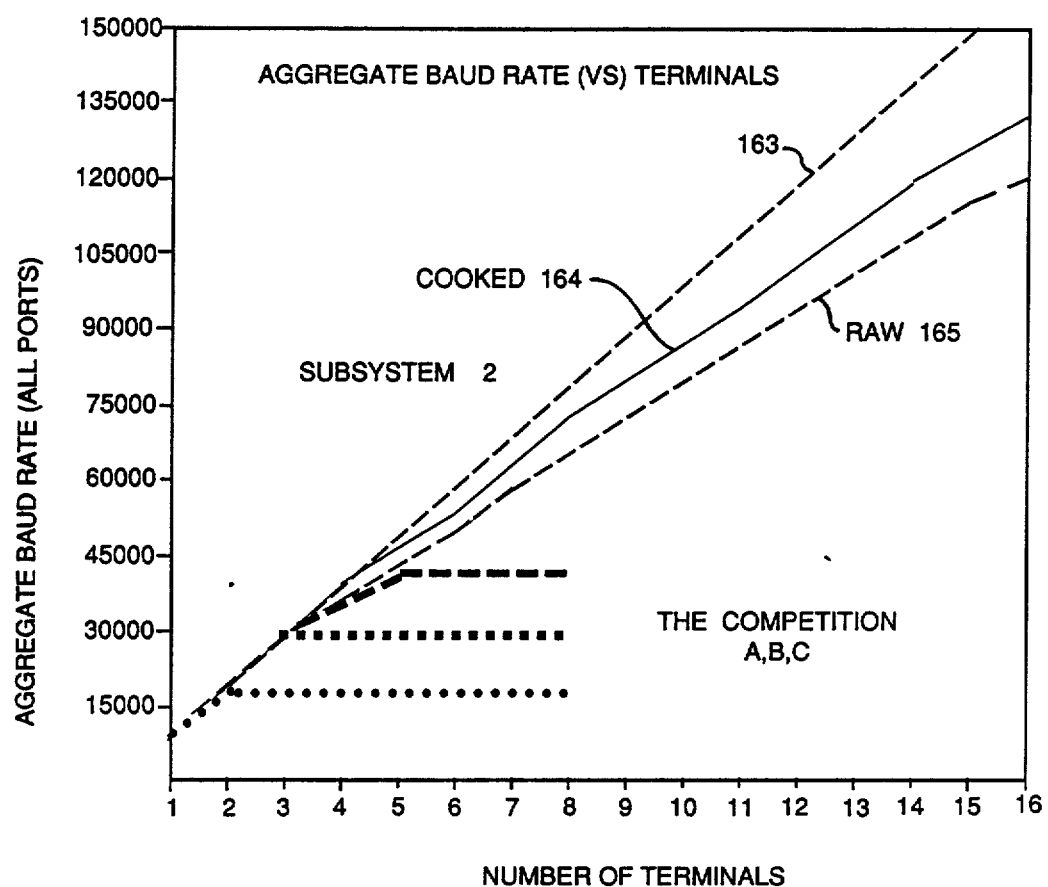

As shown in FIG. 13, the subsystem of the invention can output to 16 channels at close to 9600 Bits/sec deviating only slightly from full-response linear curve 163. In comparison most of the competitor's systems can reach a limit at 4 channels, the other at 5 channels. Beyond this figure other systems can offer no more throughput as they rely on the main CPU to process all the characters. The main CPU at this stage would be saturated. The subsystem of the invention, however, offers a linear throughput increase as defined by curves 164, 165, as the number of active terminals increases. The total output rate is in excess of 140 KBits/sec compared with 20–40 KBits/sec offered by systems of other competitors.

Note that cooked data of curve 164 has better throughput than raw curve 165. This means optimization has occurred.

Figure 14:
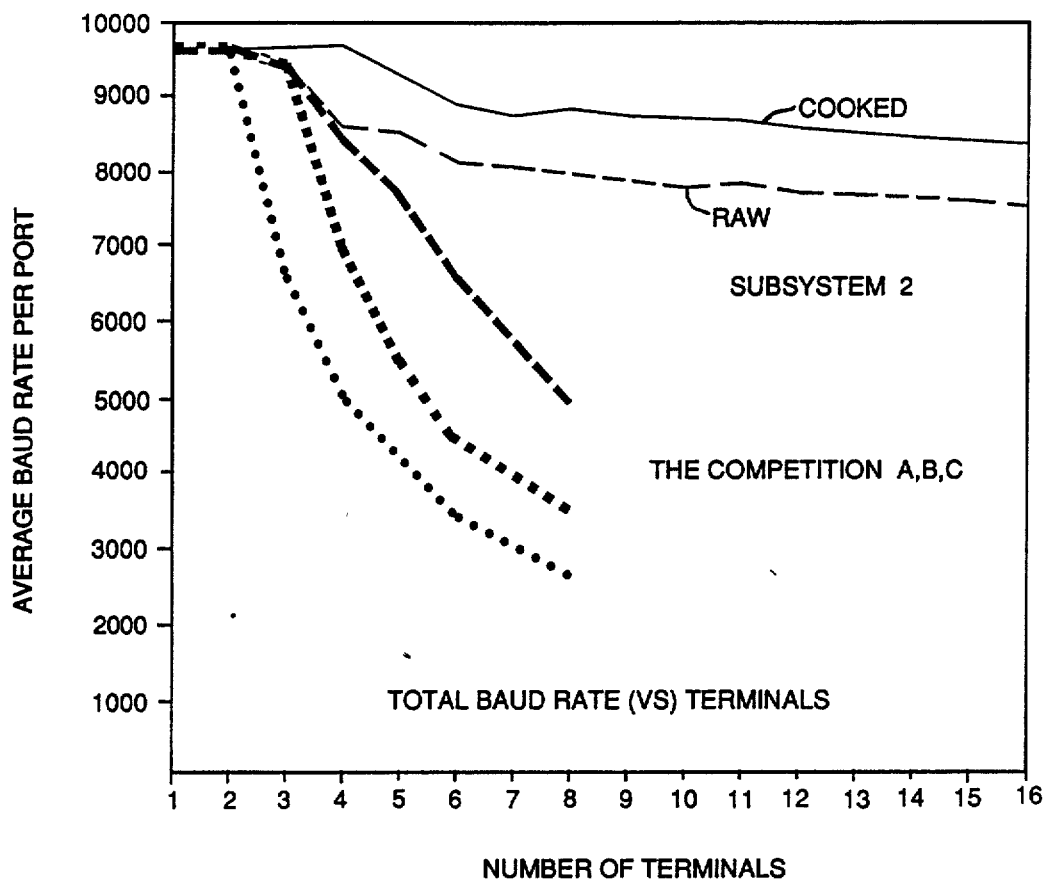

As shown in FIG. 14, the subsystem of the invention provides excellent response for 16 channels ports. The nominal output rate of 9600 Bits/sec changes only marginally between one and 16 channels as defined by curves 166, 167. The response of most systems of the competitors decays exponentially as the number of active channels increase. This means slow I/O response even under light loads. The subsystem of the invention provides a linear response for light or extremely heavy loads.

As a general observation, a conservative machine which C degrades marginally in performance as you add users is better than a fast CPU which is halved in performance when an extra user is added. Multiuser machines need distributed "intelligence" to handle separate tasks and provide good response. A properly designed subsystem frees the main CPU of all terminal I/O.

It should thus be understood that the invention is not limited to any specific embodiments set forth herein, as variations are readily apparent, and thus the invention is to be given the broadest possible interpretation within the terms of the following claims.

We claim:

1. An intelligent I/O subsystem which interfaces a plurality of serial bit communication devices each having a settable baud rate into a host personal computer (PC), having a UNIX® or its derivative operating system and executing at least one application program in a multi-processing mode, comprising in operative combination:
   (a) at least one intelligent slave I/O subassembly connected to a series of remote serial bit communication devices 1, 2 . . . n;
   (b) said I/O subassembly comprising a CPU, a dual ported memory and a serial bit communication means for communicating with a plurality of remote serial bit communication devices;
   (c) said dual ported memory being encoded with a management program module callable from said host PC via said UNIX® operating system, which program module is executed remotely by said I/O subassembly CPU independent of said host PC to:
      (i) receive characters from and transmit characters to said remote serial bit devices;
      (ii) interpret and process said characters from and to said remote serial bit communication devices consistent with standard UNIX® character processing definitions; and
   (d) said dual ported memory of said I/O subassembly receiving messages from said host PC and permitting messages to be read by said host PC simultaneously and independently of said I/O subassembly CPU receiving, transmitting, interpreting and processing said characters to and from said remote serial bit devices;
   (e) the baud rate at which said characters can be transmitted to or received from each of said remote serial bit communication devices remains constant as additional remote serial bit communication devices are connected to said I/O subassembly; and
   (f) said I/O subsystem exhibiting an increasing throughput without saturation as the number of remote serial communication devices, n, is increased,
      (i) said throughput being defined as the sum of the average baud rates of the individual remote serial bit communication devices connected to said I/O subsystem;
      (ii) said saturation being defined as a condition wherein the throughput substantially does not increase as the number of remote serial bit communication devices, n, increases, and
      (iii) the condition of saturation reduces the average baud rate of transmission of said characters to and from each remote serial bit communication device as the number of said remote serial bit communication devices, n, is increased.

2. The I/O subsystem of claim 1 in which said management module is encoded on said segmented memory and includes a message handler command submodule and an enhanced UNIX® based or equivalent line discipline submodule.

3. The I/O subsystem of claim 2 in which said message handler command submodule includes an interface submodule, a queuing submodule, a routing submodule and a low level interrupt handler submodule.

4. The I/O subsystem of claim 2 in which said enhanced UNIX® based or equivalent line discipline submodule is at least matched to a part of said host UNIX® operating system as well as including an assembly based, common mode submodule for speedily processing said asynchronous characters without reference to "C" language based procedures.

5. The I/O subsystems of claim 2 in which said enhanced UNIX® based or equivalent line discipline submodule is at least matched to a part of said host UNIX® operating system as well as includes a queue polling submodule for determining the most effective procedure for executing requests at full line speed.

6. The I/O subsystems of claim 2 in which said enhanced UNIX® based or equivalent line discipline submodule is at least matched to a part of said host UNIX® operating system as well as includes a prioritizing input mode submodule for allocating storage in said external memory so that irrespective of character serial line rate, associated characters can be stored and timely processed.

7. The I/O subsystem of claim 1 in which said management module encoded or said segmented memory is enabled by means of a UNIX® or its derivative management module in said host PC that names a device driver to perform an I/O function in a format that establishes that the request will be executed remotely by said management module.

8. The I/O subsystem of claim 1 in which n is greater than six.

9. An intelligent I/O subsystem which interfaces a plurality of serial bit communication devices each having a settable baud rate into a host personal computer (PC) having a host CPU, having a UNIX® or its derivative operating system and executing at least one application program in a multiprocessing mode, comprising in operative combination:
   (a) at least one intelligent slave I/O subassembly connected to a series of remote serial bit communication devices 1, 2. . .n;
   (b) said I/O subassembly comprising a CPU, a dual ported memory and a serial bit communication means for communicating with a plurality of remote serial bit communication devices;
   (c) said dual ported memory being encoded with a management program module callable from said host PC via said UNIX® operating system, which program module is executed remotely by said I/O subassembly CPU independent of said host PC to:
      (i) receive characters from and transmit characters to said remote serial bit devices;
      (iii) interpret and process said characters from and to said remote serial bit communication devices consistent with standard UNIX® character processing definitions; and
   (d) said dual ported memory of said I/O subassembly receiving messages from said host PC and permitting messages to be read by said host PC simultaneously and independently of said I/O subassembly CPU receiving, transmitting, interpreting and processing said characters to and from said remote serial bit devices;

(e) said simultaneous independent character processing by said I/O subassembly minimizing host CPU time related to serial bit character processing; and (f) said host CPU exhibiting a substantially decreased I/O overhead without saturation as the number of remote serial communication devices, n, is increased, (i) said host CPU I/O overhead being defined as the percentage of said host CPU time and resources being used to process serial bit I/O generated by said host in the case of output and by said serial bit communication devices in the case of input, (ii) said saturation being defined as a condition wherein said host CPU UNIX ® operating system will no longer dedicate additional operating time and resources to process said serial bit I/O; and (iii) the condition of saturation substantially reduces the performance of said host PC as the number of said remote serial bit communication devices, n, is increase.

10. The I/O subsystem of claim 9 in which said management module is encoded on said segmented memory and includes a message handler command submodule and an enhanced UNIX ® based or equivalent line discipline submodule.

11. The I/O subsystem of claim 10 in which said message handler command submodule includes an interface submodule, a queuing submodule, a routing submodule and a low level interrupt handler submodule.

12. The I/O subsystem of claim 10 in which said enhanced UNIX ® based or equivalent line discipline submodule is at least matched to a part of said host UNIX ® operating system as well as including an assembly based, common mode submodule for speedily processing said asynchronous characters without reference to "C" language based procedures.

13. The I/O subsystems of claim 10 in which said enhanced UNIX ® based or equivalent line discipline submodule is at least matched to a part of said host UNIX ® operating system as well as includes a queue polling submodule for determining the most effective procedure for executing output requests at full line speed.

14. The I/O subsystems of claim 10 in which said enhanced UNIX ® based or equivalent line discipline submodule is at least matched to a part of said host UNIX ® operating system as well as includes a prioritizing input mode submodule for allocating storage in said external memory so that irrespective of character serial line rate, associated characters can be stored and timely processed.

15. The I/O subsystem of claim 9 in which said management module encoded or said segmented memory is enabled by means of a UNIX ® or its derivative management module in said host PC that names a device driver to perform an I/O function in a format that establishes that the request will be executed remotely by said management module.

16. The I/O subsystem of claim 9 in which n is greater than six.

17. Method of managing a plurality of remote serial bit communicating devices 1, 2. . . n, each having a settable baud rate, via a host personal computer (PC), having a UNIX ® or its derivative based operating system and executing at least one program in multiprocessing mode, involving sending messages relating to said host PC and having serial characters asynchronously generated relative to or by said remote serial bit devices 1, 2. . . n, by means of at least one I/O subsystem which interfaces said plurality of remote serial bit communication devices and the host PC comprising a CPU, a dual ported memory and a serial communication means, said memory being encoded with a management program module, said method comprising the steps of:

(a) using a part of said host UNIX ® or its derivative operating system to send a group of characters formatted to form a message via a device driver program to the I/O subsystem which establishes that said message is to be executed remotely by said I/O subassembly independent of said host UNIX ® operating system;

(b) using a message handling module in residence in said I/O subassembly dual ported memory to act on communicating said message group of characters to the requested port or device; and (c) interpreting said PC message group of characters in said I/O subsystem CPU to execute a named procedure therein;

(d) using said management program module to process in said I/O subsystem CPU said asynchronously generated serial characters relating to said remote serial bit communication devices, (i) to completely eliminate said remote serial bit communication device-related serial character processing by said host PC; and (e) increasing said I/O subsystem throughput without saturation as the number of remote serial communication devices, n, is increased, (i) said throughput being defined as the sum of the average baud rates of the individual remote serial bit communication devices connected to said I/O subsystem, (ii) said saturation being defined as a condition wherein the throughput substantially does not increase as the number of remote serial bit communication devices, n, increases, and (iii) the condition of saturation reduces the average baud rate of transmission of said characters to and from each remote serial bit communication device as the number of said remote serial bit communication devices, n, is increased.

18. The method of claim 17 in which step (a) includes the substeps of:

(a) generating a request at the PC host comprising a single or block of characters normalized to a specific I/O serial device;

(b) by means of a host UNIX ® or its derivative operating system, naming a device driver in residence to perform an I/O function in a pre-selected message format;

(c) acting on said message format after establishing that the request will be executed remotely at said I/O subsystem, and;

(d) packaging and writing the normalized an grouped characters into storage boxes in the segmented memory.

19. The method of claim 17 in which n is greater than 6.

20. The method of claim 19 in which n is about 32 for a 16-bit word based host PC.

21. The I/O subassembly of claim 19 in which n is about 64 for a 32-bit word based PC host.

22. The method of claim 17 in which step (b) includes the substeps of:
   (a) translating requests on a message that limits high level functions;
   (b) scheduling the transmission of the translated requests, and;
   (c) routing the scheduled requests to appropriate queues.

23. The method of claim 17 in which step (c) is further characterized by the substep of applying UNIX ® based line discipline to said serial characters via instructions in the slave remote dual ported memory as well as applying an assemble processing procedure to common mode characters whereby processing is speeded.

24. The method of claim 22 with the additional substep of polling the queues to determine the most effective method of executing output requests at full line speed.

25. The method of claim 23 with the additional substep of prioritizing input characters so that irrespective of serial line rate, generated serial characters can be stored in said remote dual ported memory and processed.

26. The method of claim 17 in which step (c) is further comprises the substep of causing a particular slave subassembly CPU to execute a procedure and passing the results via a message to the host.

* * * * *